United States Patent
Iwamitsu et al.

(10) Patent No.: US 10,882,390 B2
(45) Date of Patent: Jan. 5, 2021

(54) VEHICLE

(71) Applicant: HONDA MOTOR CO., LTD., Tokyo (JP)

(72) Inventors: Atsuki Iwamitsu, Wako (JP); Mitsuo Muraoka, Wako (JP); Hisashi Ito, Wako (JP); Yoshinori Ando, Wako (JP); Koichiro Shinozaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 104 days.

(21) Appl. No.: 16/302,271

(22) PCT Filed: May 19, 2017

(86) PCT No.: PCT/JP2017/018784
§ 371 (c)(1),
(2) Date: Nov. 16, 2018

(87) PCT Pub. No.: WO2017/200071
PCT Pub. Date: Nov. 23, 2017

(65) Prior Publication Data
US 2019/0184808 A1    Jun. 20, 2019

(30) Foreign Application Priority Data
May 20, 2016   (JP) .................. 2016-101827

(51) Int. Cl.
*B60K 6/48* (2007.10)
*B60K 6/52* (2007.10)
(Continued)

(52) U.S. Cl.
CPC .................. *B60K 6/48* (2013.01); *B60K 6/52* (2013.01); *B60K 6/54* (2013.01); *B60L 15/20* (2013.01);
(Continued)

(58) Field of Classification Search
CPC ... B60K 6/48; B60K 6/54; B60K 6/52; B60K 6/448; B60K 7/0007; B60K 6/485;
(Continued)

(56) References Cited

U.S. PATENT DOCUMENTS

| | | | |
|---|---|---|---|
| 2006/0217229 A1 | 9/2006 | Ogata | |
| 2014/0180558 A1* | 6/2014 | Kato | .................. F02D 41/0215 701/102 |
| 2014/0228170 A1* | 8/2014 | Kato | ...................... B60K 6/445 477/35 |

FOREIGN PATENT DOCUMENTS

| | | |
|---|---|---|
| JP | 2001-045609 A | 2/2001 |
| JP | 2006-280049 A | 10/2006 |

(Continued)

OTHER PUBLICATIONS

PCT/ISA/210 from International Application Publication PCT/JP2017/018784 with the English translation thereof.

*Primary Examiner* — Rodney A Butler
(74) *Attorney, Agent, or Firm* — Carrier Blackman & Associates, PC; William D. Blackman; Joseph P. Carrier

(57) ABSTRACT

Provided is a vehicle in which an internal combustion engine can be suitably assisted by a rotating electrical machine. The vehicle is provided with an internal combustion engine, a rotating electrical machine, a transmission, a clutch placed between the transmission and the combination of the internal combustion engine and rotating electrical machine, and a motive power control device that controls the motive power of the internal combustion engine and the rotating electrical machine. The motive power control device calculates additional motive power for the rotating electrical machine on the basis of the difference between the motive-power-transmitting capacity of the clutch and the motive power of the internal combustion engine.

5 Claims, 15 Drawing Sheets

(51) Int. Cl.
*B60K 6/54* (2007.10)
*B60L 15/20* (2006.01)
*B60W 10/06* (2006.01)
*B60W 10/08* (2006.01)
*B60W 10/11* (2012.01)
*B60W 20/00* (2016.01)
*B60W 30/18* (2012.01)
*B60L 50/16* (2019.01)
*B60W 10/00* (2006.01)
*B60W 30/188* (2012.01)

(52) U.S. Cl.
CPC .............. *B60L 50/16* (2019.02); *B60W 10/00* (2013.01); *B60W 10/06* (2013.01); *B60W 10/08* (2013.01); *B60W 10/11* (2013.01); *B60W 20/00* (2013.01); *B60W 30/188* (2013.01); *Y02T 10/62* (2013.01); *Y02T 10/70* (2013.01); *Y02T 10/7072* (2013.01); *Y02T 10/72* (2013.01)

(58) Field of Classification Search
CPC ..... B60K 6/442; B60K 6/387; Y02T 10/6265; Y02T 10/6286; Y02T 10/6221; Y02T 10/7022; Y02T 10/7077; Y02T 10/7275; B60W 10/00; B60W 30/188; B60W 20/00; B60W 10/11; B60W 10/08; B60W 10/06; B60W 10/02; B60W 20/19; B60W 20/11; B60W 2520/10; B60W 2510/0291; B60W 2510/0275; B60W 2540/103; B60W 2540/10; B60W 2710/083; B60W 2710/0666; B60L 50/16; B60L 15/20; B60L 2260/26; B60L 2240/443; B60L 2250/28; B60L 2240/441; B60L 58/14; B60L 2240/12; B60L 2240/423; B60L 2240/486; B60L 2240/507
See application file for complete search history.

(56) References Cited

FOREIGN PATENT DOCUMENTS

| | | |
|---|---|---|
| JP | 2010-083417 A | 4/2010 |
| JP | 2015-123849 A | 7/2015 |

* cited by examiner

FIG. 3

| | MOTOR-ASSISTED CONTROL | |
|---|---|---|
| | CRK MOT | TRC MOT |
| INSTANTANEOUS ASSISTANCE CONTROL (RESPONSE COMPENSATION) | ACCELERATOR PEDAL: ON ($\theta ap > 0$) | (NOT ACTIVATED) |
| CONTINUOUS ASSISTANCE CONTROL (TORQUE ADDED) | ACCELERATOR PEDAL PRESSING: LARGE ($\theta ap \geq TH \theta ap$) | ACCELERATOR PEDAL PRESSING: LARGE ($\theta ap \geq TH \theta ap$) |

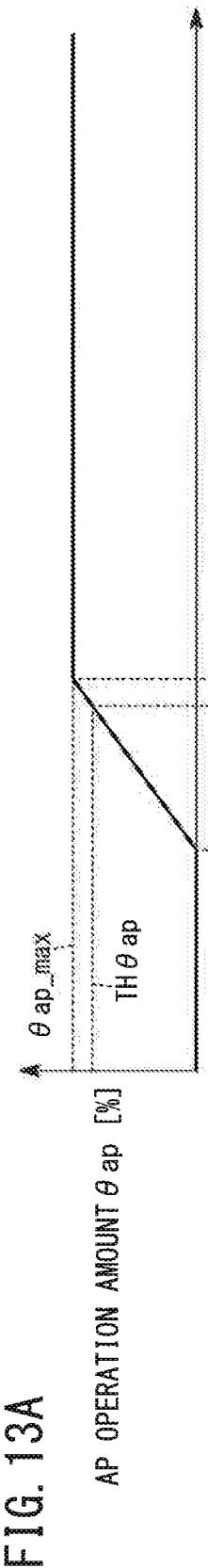
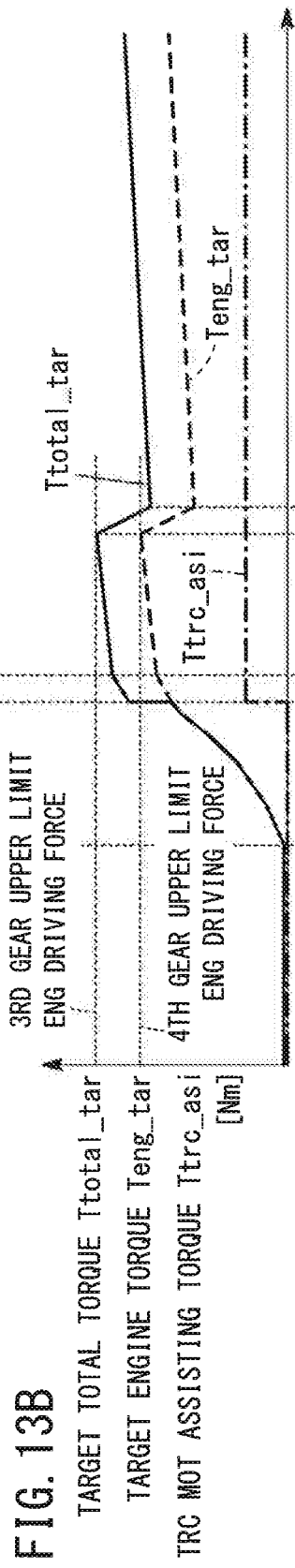
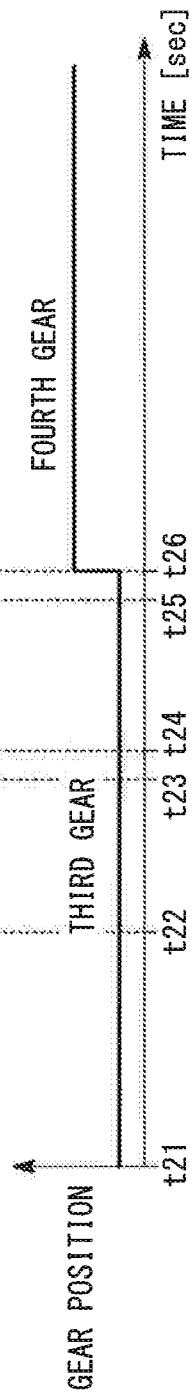

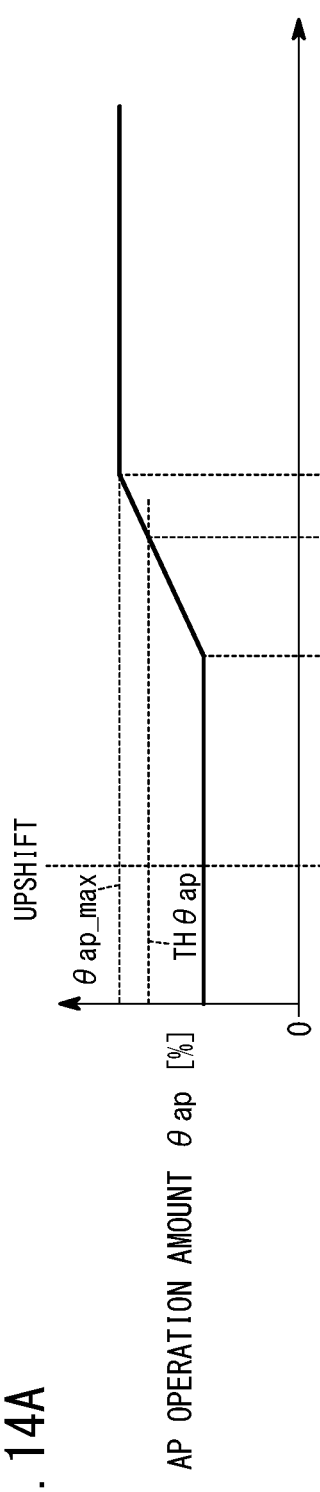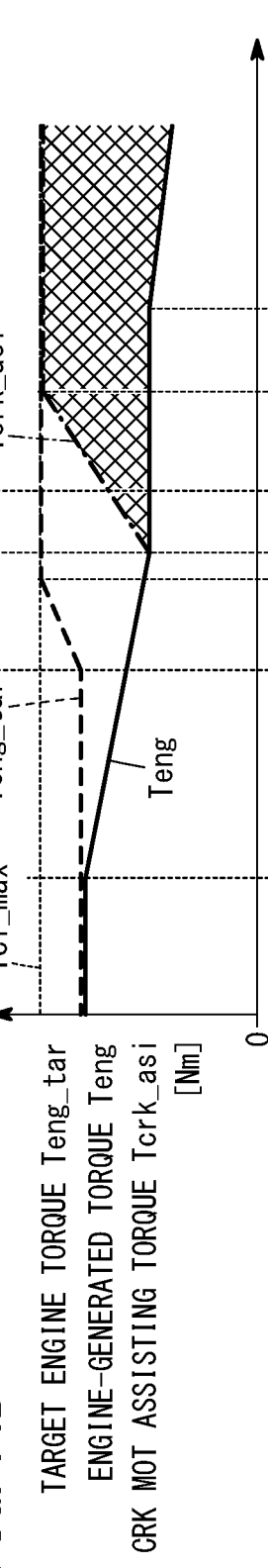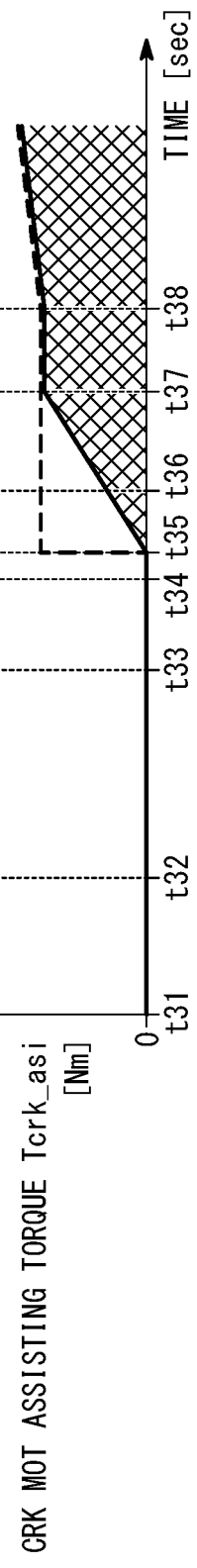

VEHICLE

TECHNICAL FIELD

The present invention relates to a vehicle that can travel by means of an engine and a rotary electric machine.

BACKGROUND ART

Japanese Laid-Open Patent Publication No. 2015-123849 has an object of providing a vehicle that can make effective use of both electric motors, one of which is connected with a wheel that is also connected with an internal combustion engine, and another of which is connected with another wheel different from the one connected with the internal combustion engine ([0006] and Abstract).

To accomplish the object, according to Japanese Laid-Open Patent Publication No. 2015-123849 (Abstract), a power control device 28 of a vehicle 10 performs control so that a target vehicle power is satisfied by at least either one or both of an internal combustion engine 12 and combination of first electric motors 16, 18 when the target vehicle power is forward power and connecting/disconnecting means 38a, 38b (FIG. 1) are in a coupled state. When the target vehicle power is forward power and the connecting/disconnecting means 38a, 38b are in a released state, the power control device 28 performs control so that the target vehicle power is satisfied by at least one of a second electric motor 14 and the internal combustion engine 12.

The first electric motors 16, 18 (rear motors 16, 18) are connected with clutches 38a, 38b (FIG. 1) which are different from clutches 102, 104 (FIG. 2) of the internal combustion engine 12. The second electric motor 14 (front motor 14) is connected with the same clutch 102 as the internal combustion engine 12 (FIG. 2 and [0035] to [0057]).

Japanese Laid-Open Patent Publication No. 2015-123849 discloses a partial assist mode (S6 in FIG. 3, and FIGS. 4, 7, and 8) and a full-assist mode (S7 in FIG. 3, and FIGS. 4 to 6) for a case where the internal combustion engine 12 and the second electric motor 14 simultaneously generate drive force for traveling.

In the full-assist mode, when a vehicle speed V does not exceed a first vehicle speed threshold THv1 (S11 in FIG. 5: NO), assisting-motor first switching is performed to switch from the assistance by the rear motors 16, 18 to the assistance by the front motor 14 (S14). The determination at step S11 may be based on some other parameters that can estimate a number of revolutions Nmot of the rear motors 16, 18 ([0070]). The same applies to the partial assist mode (S21 in FIG. 7: NO→S24). The reason for using the number of revolutions Nmot of the rear motors 16, 18 as the criterion for determination is to prevent excessive rotation of the rear motors 16, 18, for instance ([0100], [0104], and [0107]).

SUMMARY OF INVENTION

As noted above, according to Japanese Laid-Open Patent Publication No. 2015-123849, the front motor 14 is driven instead of the rear motors 16, 18 in order to prevent excessive rotation of the rear motors 16, 18 connected with the clutches 38a, 38b different from the clutches 102, 104 of the internal combustion engine 12. However, the front motor 14 connected with the clutch 102 same as the internal combustion engine 12 has some potential for further utilization.

For example, when a typical internal combustion engine operates in high-revolution region, it exhibits a tendency of its power (torque) decreasing as its rotating speed increases. Even when such a tendency is shown in the configuration of Japanese Laid-Open Patent Publication No. 2015-123849, the power transmission capacity of the clutches 102, 104 or a value in the vicinity thereof can be produced only with the power of the internal combustion engine 12 if the power of the internal combustion engine 12 is equal to or greater than the power transmission capacity of the clutches 102, 104.

However, when the power of the internal combustion engine 12 is below the power transmission capacity of the clutches 102, 104 in a high-revolution region, the power transmission capacity of the clutches 102, 104 or a value in the vicinity thereof cannot be reached only with the power of the internal combustion engine 12. In such a case, there is room for increasing the power that can be transmitted via the clutches 102, 104.

Additionally, control of the front motor 14 in consideration of the power transmission capacity of the clutches 102, 104 can also be applied to a low-revolution region.

The present invention has been made in view of these challenges, and an object thereof is to provide a vehicle that can appropriately assist an internal combustion engine by using a rotary electric machine.

A vehicle according to the present invention includes: an internal combustion engine; a rotary electric machine; a transmission; a clutch positioned between the transmission and combination of the internal combustion engine and the rotary electric machine; and a power control device configured to control a power of the internal combustion engine and a power of the rotary electric machine, wherein the power control device is configured to calculate an additional power of the rotary electric machine based on a difference between a power transmission capacity of the clutch and the power of the internal combustion engine.

According to the present invention, additional power of the rotary electric machine is calculated based on the difference between the power transmission capacity of the clutch and the power of the internal combustion engine. This enables generation of total power in a range that can be transmitted by the clutch even in a case where the rotary electric machine is positioned on the same side as the internal combustion engine relative to the clutch and power of the rotary electric machine is generated in addition to the power of the internal combustion engine. Therefore, to the extent that the power of the internal combustion engine does not exceed the power transmission capacity of the clutch, more power can be generated by the entire vehicle or power can be increased or decreased more quickly, for example. Thus, the internal combustion engine can be appropriately assisted by the rotary electric machine.

The power control device may be configured to calculate the additional power of the rotary electric machine based on a difference between the power transmission capacity of the clutch and a maximum power of the internal combustion engine. According to this, the additional power of the rotary electric machine is calculated based on the difference between the power transmission capacity of the clutch and the maximum power of the internal combustion engine. This enables generation of total power in a range that can be transmitted by the clutch even in a case where the rotary electric machine is positioned on the same side as the internal combustion engine relative to the clutch and power of the rotary electric machine is generated in addition to the maximum power of the internal combustion engine. Thus, a relatively large total power can be generated.

The power control device may be configured to set: a first speed region, being a region of rotating speed of the internal combustion engine in which the power of the internal combustion engine alone is configured to exceed the power transmission capacity of the clutch, and a second speed region, being a region of the rotating speed which is higher than the first speed region and in which the power of the internal combustion engine alone is not configured to exceed the power transmission capacity of the clutch. Also, when the rotating speed is in the first speed region, the power control device may be configured to generate the power of the internal combustion engine without the additional power of the rotary electric machine. Further, when the rotating speed is in the second speed region, the power control device may be configured to generate the power of the internal combustion engine and the additional power of the rotary electric machine.

This enables a relatively large total power to be generated in a region of relatively high rotating speed of the internal combustion engine (the second speed region), while suppressing the power consumption of the rotary electric machine in a region of relatively low rotating speed of the internal combustion engine (the first speed region).

Even if the rotating speed is in the second speed region, when an operation amount of an accelerator pedal is lower than an operation amount threshold, the power control device may be configured to prohibit generation of the additional power of the rotary electric machine. This can suppress the power consumption of the rotary electric machine when a driver has no or weak intention for acceleration. Thus, electric power management suiting the driver's intention for acceleration becomes possible (for example, power saving when he/she has low intention for acceleration).

The vehicle may include a kickdown switch configured to effect a kickdown to downshift the transmission when a certain pressing operation is done on the accelerator pedal. The power control device may be configured to set the operation amount threshold at a value smaller than a kickdown threshold which is the operation amount at which the kickdown switch turns on.

This will cause the additional power of the rotary electric machine to be already generated when the driver recognizes that the kickdown switch has turned on. This can prevent the driver from feeling confused about additional power of the rotary electric machine not being generated even though the driver has kicked down.

BRIEF DESCRIPTION OF DRAWINGS

FIG. 3 is a diagram showing the relationship between a motor that operates in motor-assisted control of the embodiment and the operation amount of an accelerator pedal (AP operation amount);

FIG. 13A is a diagram showing a first example of temporal change in the AP operation amount in the embodiment; FIG. 13B is a diagram showing an example of target total torque, target engine torque, and TRC MOT assisting torque corresponding to the AP operation amount of FIG. 13A; and FIG. 13C is a diagram showing an example of gear positions corresponding to FIGS. 13A and 13B;

FIG. 14A is a diagram showing an example of temporal change in the AP operation amount in the embodiment; FIG. 14B is a diagram showing an example of the target engine torque, engine-generated torque, and CRK MOT assisting torque corresponding to the AP operation amount of FIG. 14A; and FIG. 14C is a diagram showing an example of the CRK MOT assisting torque corresponding to the AP operation amount of FIG. 14A.

DESCRIPTION OF EMBODIMENTS

A. Embodiment

<A-1. Configuration>
[A-1-1. Overall Configuration]

Figure 1:
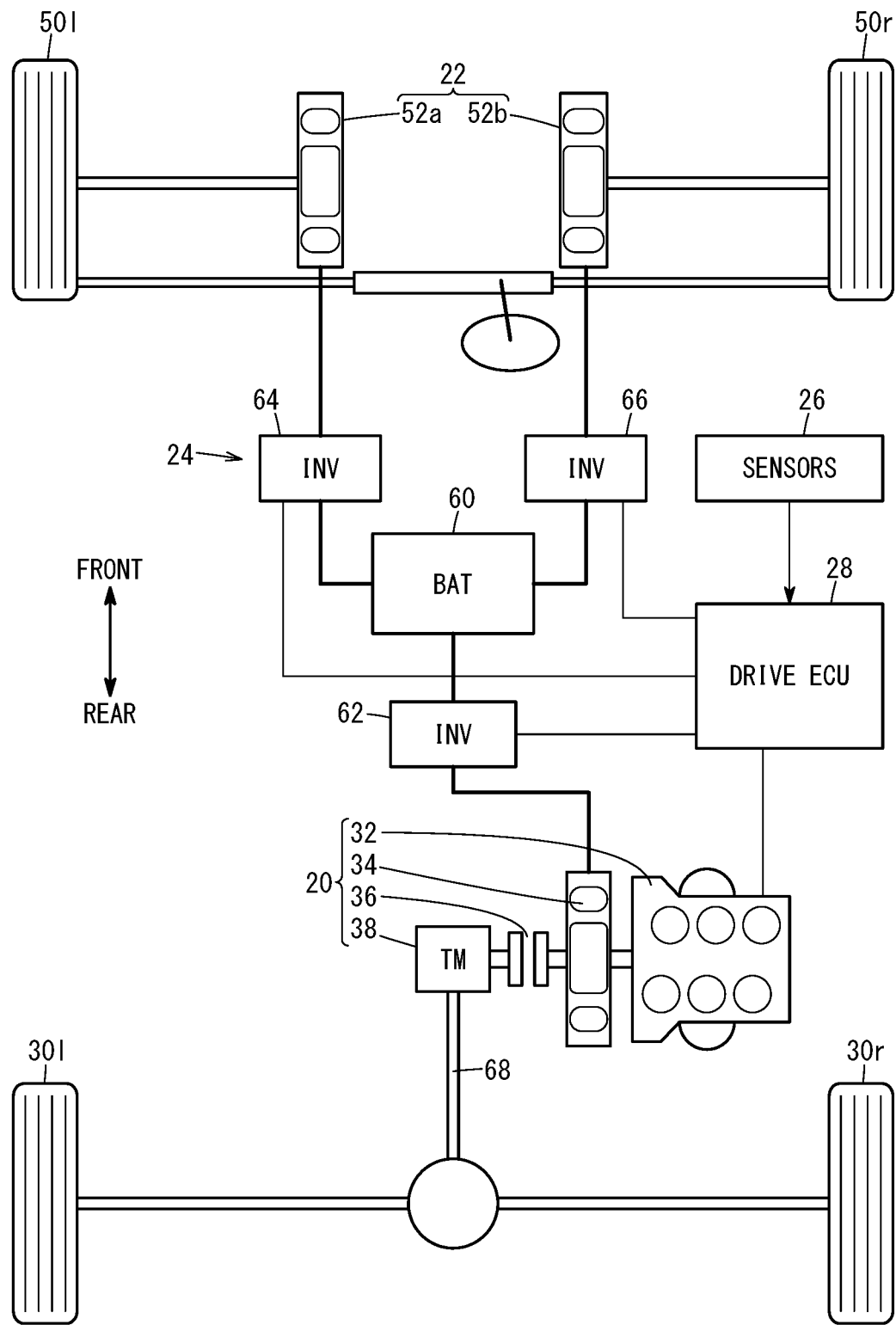
FIG. 1 schematically shows a configuration of part of a vehicle according to an embodiment of the present invention.

FIG. 1 schematically shows a configuration of part of a vehicle 10 according to an embodiment of the present invention. The vehicle 10 includes a rear wheel drive device 20, a front wheel drive device 22, an electric system 24, sensors 26, and a drive electronic control unit 28 (hereinafter referred to as "drive ECU 28" or "ECU 28").

The rear wheel drive device 20 drives a left rear wheel 30*l* and a right rear wheel 30*r* (hereinafter referred to as "rear wheels 30*l*, 30*r*" or collectively as "rear wheel 30"). The rear wheel drive device 20 includes an engine 32, a first traction motor 34, a clutch 36, and a transmission 38.

The front wheel drive device 22 drives a left front wheel 50*l* and a right front wheel 50*r* (hereinafter referred to as "front wheels 50*l*, 50*r*" or collectively as "front wheel 50"). The front wheel drive device 22 includes a second traction motor 52*a* and a third traction motor 52*b*. The rear wheel drive device 20 and the front wheel drive device 22 are not mechanically connected with each other, being provided separately and independently.

The electric system 24 supplies electric power to the first to third traction motors 34, 52*a*, 52*b*, and has a high-voltage battery 60 and first to third inverters 62, 64, 66. The drive ECU 28 controls the power of the engine 32 and of the first to third traction motors 34, 52a, 52b.

[A-1-2. Rear Wheel Drive Device 20]

For example, under a medium load, the rear wheel drive device 20 performs driving by the engine 32 only, and under a high load by the engine 32 and the first motor 34. When the vehicle 10 is under a low load, driving may be performed only by the first motor 34.

The engine 32 (internal combustion engine) is a six-cylinder engine, for example, though it may be other type of engine, such as a two-, four- or eight-cylinder engine. Also, the engine 32 is not limited to a gasoline engine but may be other type of engine such as a diesel engine.

Although FIG. 1 shows the engine 32 and the first traction motor 34 as being positioned near the rear wheel 30 for easier understanding of the relation of their coupling with the rear wheel 30, they may be positioned in an engine room (not shown) provided on the front side of the vehicle 10. The transmission 38 then may be connected with the rear wheel 30 via a propeller shaft 68.

The first traction motor 34 (a rotary electric machine) generates traveling power for the vehicle 10 and also generates electricity by the power of the engine 32. The first traction motor 34 further carries out cranking for rotating a crankshaft, not illustrated, of the engine 32 at the startup of the engine 32.

The first motor 34 is a three-phase AC brushless motor, for example, though it may be other type of motor such as three-phase AC brushed motor and a single-phase AC or DC motor. The specifications of the first motor 34 may be the same as or different from those of the second motor 52a and the third motor 52b. In any specification, the first motor 34 is capable of generating both torque in forward direction (rotation that moves the vehicle 10 forward) and torque in reverse direction (rotation that moves the vehicle 10 backward).

Hereinafter, the first traction motor 34 is also referred to as cranking motor 34, a CRK MOT 34, or a motor 34. Although this embodiment includes no cranking motor (or starter motor) separate from the first traction motor 34, such a separate cranking motor may be provided. The power of the engine 32 and the first traction motor 34 is sometimes called as a rear wheel power.

The clutch 36 is positioned between the transmission 38 and the combination of the engine 32 and the CRK MOT 34. When the clutch 36 is on (is in a connected state), the power of the engine 32 and the CRK MOT 34 can be transmitted to the rear wheel 30, and the power from the rear wheel 30 can be transmitted to the CRK MOT 34 for regeneration therein. When the clutch 36 is off (is in a non-connected state), the power of the engine 32 and the CRK MOT 34 is not transmitted to the rear wheel 30. In this situation, electricity can be generated in the CRK MOT 34 with the power of the engine 32.

The transmission 38 in this embodiment is an automatic transmission. However, the transmission 38 may be other type of transmission such as a manual transmission.

[A-1-3. Front Wheel Drive Device 22]

The second motor 52a, having its output shaft being connected with the rotating shaft of the left front wheel 50l, transmits drive force to the left front wheel 50l. The third motor 52b, having its output shaft being connected with the rotating shaft of the right front wheel 50r, transmits drive force to the right front wheel 50r. A clutch and/or a reducer, not illustrated, may be provided between the front wheel 50 and the second traction motor 52a and between the front wheel 50 and the third traction motor 52b.

The second traction motor 52a and the third traction motor 52b generate traveling power for the vehicle 10 and also generate electricity by power from the front wheel 50. Hereinafter, the second traction motor 52a and the third traction motor 52b are also referred to as TRC MOTs 52a, 52b or motors 52a, 52b, and they are collectively called as a TRC MOT 52 or a motor 52. Also, the power transmitted from the front wheel drive device 22 to the front wheel 50 is called as a front wheel power.

The second motor 52a and the third motor 52b are three-phase AC brushless motors, for example, though they may be other kind of motor, such as three-phase AC brushed motor and single-phase AC or DC motor. The specifications of the second motor 52a and the third motor 52b may be the same as or different from those of the first motor 34.

[A-1-4. Electric System 24]

The high-voltage battery 60 supplies electric power to the first to third motors 34, 52a, 52b via the first to third inverters 62, 64, 66, and is charged with regenerated power Preg from the first to third motors 34, 52a, 52b.

The battery 60 is an energy storage device (an energy storage) including multiple battery cells and may be a lithium-ion secondary battery or a nickel-hydrogen secondary battery, for example. Instead of the battery 60, an energy storage device such as a condenser may be used. A DC-DC converter not illustrated may be provided between the battery 60 and the first to third inverters 62, 64, 66 so that the output voltage of the battery 60 or the output voltage of the first to third motors 34, 52a, 52b may be elevated or lowered.

The first to third inverters 62, 64, 66 have three-phase full-bridge configuration and perform DC-AC conversion. That is, the first to third inverters 62, 64, 66 convert DC to three-phase AC and supply it to the first to third motors 34, 52a, 52b. The first to third inverters 62, 64, 66 also supply DC after AC-DC conversion associated with regenerating operation of the first to third motors 34, 52a, 52b to the battery 60.

[A-1-5. Sensors 26]

Figure 2:
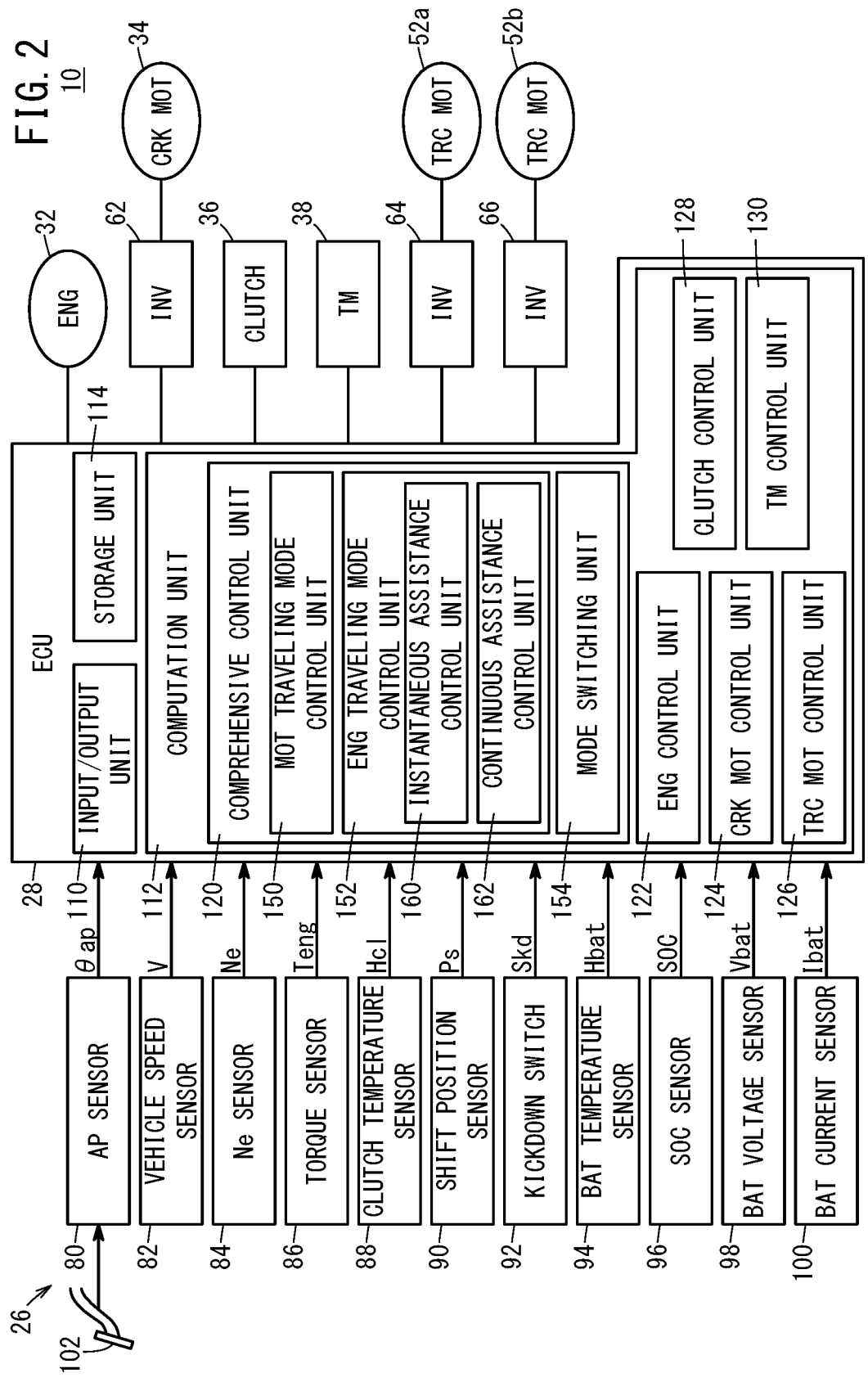
FIG. 2 is a block diagram showing the details of sensors and a drive electronic control unit in the embodiment.

FIG. 2 is a block diagram showing the details of the sensors 26 and the ECU 28 in this embodiment. As shown in FIG. 2, the sensors 26 include an accelerator pedal sensor 80, a vehicle speed sensor 82, an engine rotating speed sensor 84, an engine torque sensor 86, a clutch temperature sensor 88, a shift position sensor 90, a kickdown switch 92, a battery temperature sensor 94, an SOC sensor 96, a battery voltage sensor 98, and a battery current sensor 100.

The accelerator pedal sensor 80 (also referred to hereinafter as "AP sensor 80") detects an operation amount θap (also referred to hereinafter as "AP operation amount θap") [%] of an accelerator pedal 102. The vehicle speed sensor 82 detects the vehicle speed V [km/h] of the vehicle 10.

The engine rotating speed sensor 84 (also referred to hereinafter as "Ne sensor 84") detects an engine rotating speed Ne [rpm], indicating the number of revolutions of the engine per unit time. The engine torque sensor 86 (also referred to hereinafter as "torque sensor 86") detects a torque Teng generated by the engine 32 (also referred to hereinafter as "engine torque Teng" or "engine-generated torque Teng").

The clutch temperature sensor 88 detects a temperature Hcl of the clutch 36 (also referred to hereinafter as "clutch temperature Hcl"). The shift position sensor 90 detects shift position Ps. The shift position Ps also includes the gear position of the transmission 38. The shift position Ps is used for determining whether a shift change (an upshift in particular) is taking place or not.

The kickdown switch 92 detects a kickdown operation of the driver based on the operation amount θap of the accelerator pedal 102 and outputs a kickdown signal Skd. The kickdown switch 92 is used to effect a kickdown to downshift the transmission 38 when a certain pressing operation is done on the accelerator pedal 102 (details are discussed later with reference to FIG. 7 and others).

The battery temperature sensor 94 (also referred to hereinafter as "BAT temperature sensor 94") detects a temperature Hbat of the battery 60 (also referred to hereinafter as "battery temperature Hbat"). The SOC sensor 96 detects the SOC of the battery 60. The battery voltage sensor 98 (also referred to hereinafter as "BAT voltage sensor 98") detects an input/output voltage Vbat of the battery 60 (also referred to hereinafter as "voltage Vbat" or "battery voltage Vbat"). The battery current sensor 100 (also referred to hereinafter as "BAT current sensor 100") detects an input/output current Ibat of the battery 60 (also referred to hereinafter as "current Ibat" or "battery current Ibat"). The temperature Hbat, voltage Vbat, and current Ibat of the battery 60 are used for calculation of a discharge limit value Pbat_lim (output limit) of the battery 60.

[A-1-6. Drive ECU 28]

The drive ECU 28 controls the engine 32 and the first to third inverters 62, 64, 66, thereby controlling the outputs of the engine 32 and the first to third motors 34, 52*a*, 52*b*. The drive ECU 28 further controls the clutch 36 and the transmission 38 in addition to the engine 32 and the first to third inverters 62, 64, 66 so as to control a power Fv of the entire vehicle 10.

As shown in FIG. 2, the ECU 28 includes an input/output unit 110, a computation unit 112, and a storage unit 114. The input/output unit 110 performs signal input and output between the ECU 28 and the other components. The input/output unit 110 may include an operation input/output device (Human-Machine Interface: HMI) for an occupant (including the driver).

The computation unit 112 controls the power Fv of the vehicle 10 by executing programs stored in the storage unit 114 and is composed of a central processing unit (CPU), for example. As shown in FIG. 2, the computation unit 112 includes a comprehensive control unit 120, an engine control unit 122, a crank motor control unit 124, a traction motor control unit 126, a clutch control unit 128, and a transmission control unit 130.

The comprehensive control unit 120 manages the power Fv of the entire vehicle 10. The comprehensive control unit 120 includes a motor traveling mode control unit 150, an engine traveling mode control unit 152, and a mode switching unit 154.

The motor traveling mode control unit 150 (also referred to hereinafter as "MOT traveling mode control unit 150") performs various kinds of control when the traveling mode of the vehicle 10 is a motor traveling mode.

The engine traveling mode control unit 152 (also referred to hereinafter as "ENG traveling mode control unit 152") performs various kinds of control when the traveling mode of the vehicle 10 is an engine traveling mode. The ENG traveling mode control unit 152 includes an instantaneous assistance control unit 160 and a continuous assistance control unit 162. The instantaneous assistance control unit 160 implements instantaneous assistance control as discussed later. The continuous assistance control unit 162 implements continuous assistance control as discussed later.

The mode switching unit 154 switches the traveling modes.

The engine control unit 122 (also referred to hereinafter as "ENG control unit 122") controls the engine 32 through adjustment of the amount of fuel injection, ignition control on the engine 32, adjustment of the opening of a throttle valve (not shown), and so forth.

The crank motor control unit 124 (also referred to hereinafter as "CRK MOT control unit 124") controls the CRK MOT 34, for example, through control of the inverter 62. The traction motor control unit 126 (also referred to hereinafter as "TRC MOT control unit 126") controls the TRC MOTs 52*a*, 52*b*, for example, through control of the inverters 64, 66. The clutch control unit 128 controls the connection state of the clutch 36.

The transmission control unit 130 (also referred to hereinafter as "TM control unit 130") controls the gear position of the transmission 38 by means of the AP operation amount θap, the vehicle speed V, the kickdown signal Skd, and so forth.

The storage unit 114 (FIG. 2) stores programs and data for use by the computation unit 112. The storage unit 114 has a random access memory (hereinafter "RAM"), for example. The RAM may be a volatile memory such as a register or a non-volatile memory such as a flash memory. The storage unit 114 may also have a read only memory (hereinafter "ROM") in addition to the RAM.

This embodiment assumes that the programs and data for use by the computation unit 112 are stored in the storage unit 114 of the vehicle 10. However, some of the programs and data may be received from an external server (not shown) via a wireless device (not shown) included in the input/output unit 110.

The drive ECU 28 may be a combination of multiple ECUs. For example, the drive ECU 28 may be composed of multiple ECUs provided respectively for the engine 32 and the first to third motors 34, 52*a*, 52*b* and an ECU for managing the driving states of the engine 32 and the first to third motors 34, 52*a*, 52*b*.

<A-2. Vehicle Power Control>

[A-2-1. Overview]

This embodiment uses the motor traveling mode, in which the vehicle 10 is driven by the TRC MOTs 52*a*, 52*b*, and the engine traveling mode, in which the vehicle 10 is driven mainly by the engine 32. The engine traveling mode includes a hybrid mode in which additional power (additional torque in the context of the control in this embodiment) generated by the motors 34, 52*a*, 52*b* is added as necessary.

In this embodiment, the mode switching unit 154 of the ECU 28 switches the traveling modes mainly depending on the vehicle speed V and the AP operation amount θap. For example, when the vehicle 10 is at low vehicle speed and the AP operation amount θap does not exceed an operation amount threshold THθap, the ECU 28 selects the motor traveling mode. When the vehicle 10 is at medium or high vehicle speed and the AP operation amount θap does not exceed the operation amount threshold THθap, the ECU 28 selects the engine traveling mode. When the AP operation amount θap exceeds the operation amount threshold THθap during the engine traveling mode, the ECU 28 selects the hybrid mode.

At low vehicle speed, the CRK motor 14 may be driven by the engine 32 with the engine 32 disconnected from (or connected with) the transmission 38 via the clutch 36 so as to generate electricity in the CRK motor 14, and the generated electricity may be supplied to the TRC motors 16, 18 or an auxiliary unit not illustrated, or the battery 60 may be charged with the generated electricity. In other words, the CRK motor 14 can be used as a power generator as well.

The ECU 28 further controls the power of the engine 32 and the first to third motors 34, 52a, 52b using the AP operation amount θap and the like per vehicle speed V. In the context of the control in this embodiment, the power of the engine 32 and the first to third motors 34, 52a, 52b is controlled as a torque [Nm]. However, the power of the engine 32 and the first to third motors 34, 52a, 52b may be controlled as a drive force in Newton (N).

Hereinbelow, the torque of the engine 32 is referred to as engine torque Teng or torque Teng. The torque of the first motor 34 is referred to as CRK MOT torque Tcrk, motor torque Tcrk, or torque Tcrk. Torque Tcrk for assisting the engine 32 in particular is also referred to as CRK MOT assisting torque Tcrk_asi or assisting torque Tcrk_asi. The torque of the second motor 52a and the third motor 52b is referred to as TRC MOT torque Ttrc, motor torque Ttrc, or torque Ttrc. Torque Ttrc for assisting the engine 32 in particular is also referred to as TRC MOT assisting torque Ttrc_asi or assisting torque Ttrc_asi. The torques of the first to third motors 34, 52a, 52b are collectively called as motor torque Tmot or torque Tmot. Torque Tmot for assisting the engine 32 in particular is also referred to as motor assisting torque Tmot_asi or assisting torque Tmot_asi.

[A-2-2. Motor-Assisted Control]

In the engine traveling mode (including the hybrid mode), the ECU 28 executes motor-assisted control for assisting the engine 32 by the motors 34, 52a, 52b. Motor-assisted control is used when the engine 32 is activated in order to drive the vehicle 10 mainly by the engine 32 or when the vehicle 10 is being driven mainly by the engine 32.

Motor-assisted control includes instantaneous assistance control and continuous assistance control. The instantaneous assistance control refers to control that momentarily compensates for a response delay of the engine torque Teng with motor torque Tmot (in this embodiment, CRK MOT torque Tcrk in particular) when the engine 32 is activated. The continuous assistance control refers to control that continually adds the motor torque Tmot (in this embodiment, CRK MOT torque Tcrk and TRC MOT torque Ttrc) as additional torque to the engine torque Teng.

In relation to the instantaneous assistance control, a response delay of the engine torque Teng includes a response delay before the engine torque Teng reaches a target engine torque Teng_tar at the startup of the engine 32, for example. A response delay of the engine torque Teng also includes a delay before the engine torque Teng reaches the target engine torque Teng_tar along with upshifting of the transmission 38.

FIG. 3 is a diagram showing the relationship between a motor that operates in the motor-assisted control of this embodiment and the AP operation amount θap. As shown in FIG. 3, in the instantaneous assistance control, when the accelerator pedal 102 is on (in other words, when the AP operation amount θap is above zero, for example), the CRK MOT 34 operates but the TRC MOTs 52a, 52b do not.

In the continuous assistance control, when the pressing of the accelerator pedal 102 is large (in other words, when the AP operation amount θap is equal to or greater than the operation amount threshold THθap), the CRK MOT 34 and the TRC MOTs 52a, 52b operate.

Figure 4:
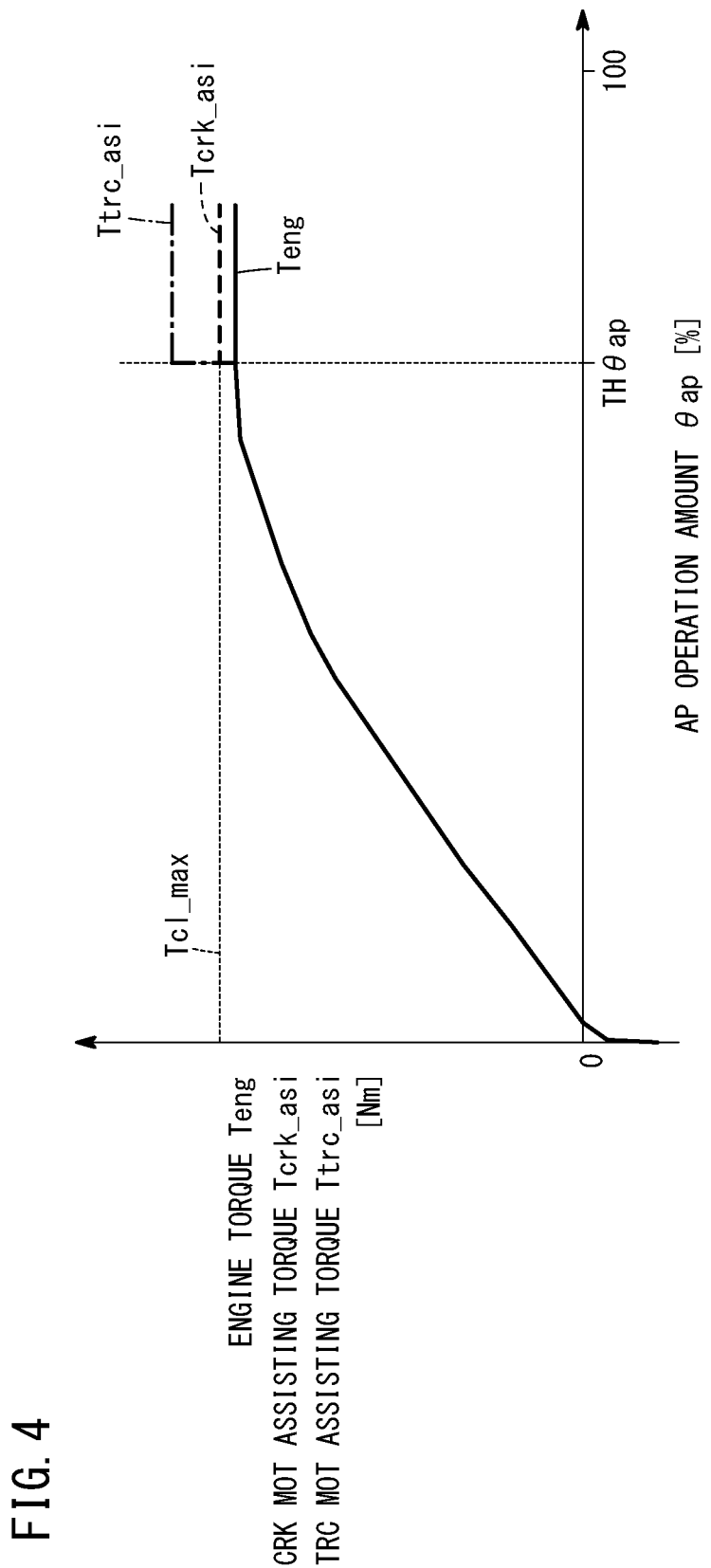
FIG. 4 is a diagram showing the relationship between the AP operation amount and the torques of various drive sources at high vehicle speed in an engine traveling mode of the embodiment.

FIG. 4 is a diagram showing the relationship between the AP operation amount θap and the torques of the drive sources (the engine 32 and the first to third motors 34, 52a, 52b) at high vehicle speed in the engine traveling mode of this embodiment. As shown in FIG. 4, only the engine 32 is activated when the AP operation amount θap is below the operation amount threshold THθap. When the AP operation amount θap is equal to or greater than the operation amount threshold THθap, the CRK MOT 34 and the TRC MOTs 52a, 52b are activated in addition to the engine 32 (continuous assistance control). In this way, the engine torque Teng and assisting torques Tcrk_asi, Ttrc_asi are generated.

As shown in FIG. 4, when the AP operation amount θap is equal to or greater than the operation amount threshold THθap, motor torque Tmot in the continuous assistance control is substantially constant (or substantially a fixed value) regardless of the AP operation amount θap (details are discussed later with reference to FIGS. 8, 9, and 12).

[A-2-3. Vehicle Power Control in Engine Traveling Mode]

(A-2-3-1. Overview)

Figure 5:
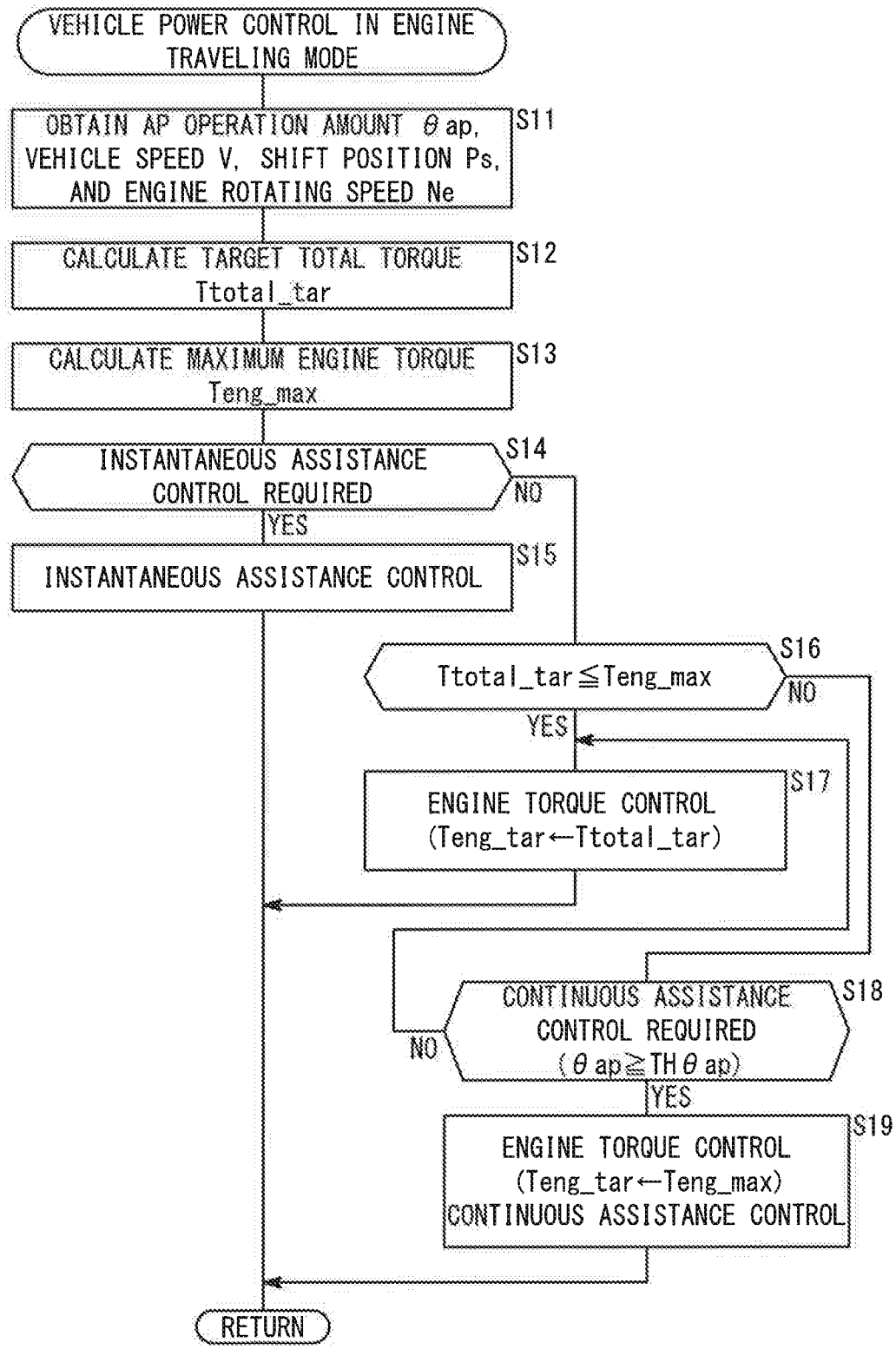
FIG. 5 is a flowchart of vehicle power control in the engine traveling mode of the embodiment.

FIG. 5 is a flowchart of vehicle power control in the engine traveling mode of this embodiment. At step S11, the ECU 28 obtains the AP operation amount θap, the vehicle speed V, the shift position Ps, and the engine rotating speed Ne. At step S12, the ECU 28 calculates a target total torque Ttotal_tar based on the AP operation amount θap, the vehicle speed V, and the shift position Ps. The target total torque Ttotal_tar indicates a target torque for the entire vehicle 10.

At step S13, the ECU 28 calculates a maximum engine torque Teng_max using the engine rotating speed Ne (details are discussed later with reference to FIG. 6).

At step S14, the ECU 28 determines whether instantaneous assistance control is required or not. For example, the ECU 28 determines that instantaneous assistance control is required in the following cases:

when switching from the MOT traveling mode to the ENG traveling mode (when the engine 32 is started); and when it is determined that an upshift has been performed based on the shift position Ps.

If it is determined that instantaneous assistance control is required (S14: YES), the ECU 28 executes instantaneous assistance control at step S15 (details are discussed later). If it is not determined that instantaneous assistance control is required (S14: NO), the flow proceeds to step S16.

At step S16, the ECU 28 determines whether the target total torque Ttotal_tar calculated at step S12 is equal to or smaller than the maximum engine torque Teng_max calculated at step S13. If the target total torque Ttotal_tar is equal to or smaller than the maximum engine torque Teng_max (S16: YES), the flow proceeds to step S17.

At step S17, the ECU 28 executes engine torque control. In the engine torque control, the engine 32 is controlled while the target total torque Ttotal_tar is set as the target engine torque Teng_tar. At step S17, no motor assistance is performed.

At step S16, when the target total torque Ttotal_tar is not equal to or not smaller than the maximum engine torque Teng_max (S16: NO), the ECU 28 determines whether continuous assistance control is required or not at step S18. For example, the ECU 28 determines whether the AP operation amount θap is equal to or greater than the operation amount threshold THθap. The operation amount threshold THθap is a threshold to determine whether the driver wants quick acceleration or not. A setting method of the operation amount threshold THθap is described later with reference to FIG. 7.

If continuous assistance control is not required (S18: NO), the flow proceeds to step S17. Note that in this case the maximum engine torque Teng_max is set as the target engine torque Teng_tar (Teng_tar←Teng_max). If continuous assistance control is required (S18: YES), the flow proceeds step S19.

At step S19, the ECU 28 executes engine torque control and continuous assistance control. Unlike step S17, for the engine torque control at step S19, the maximum engine torque Teng_max is set as the target engine torque Teng_tar. Continuous assistance control is discussed later with reference to FIG. 8, for example.

(A-2-3-2. Calculation of Maximum Engine Torque Teng_max (S13 in FIG. 5))

Figure 6:
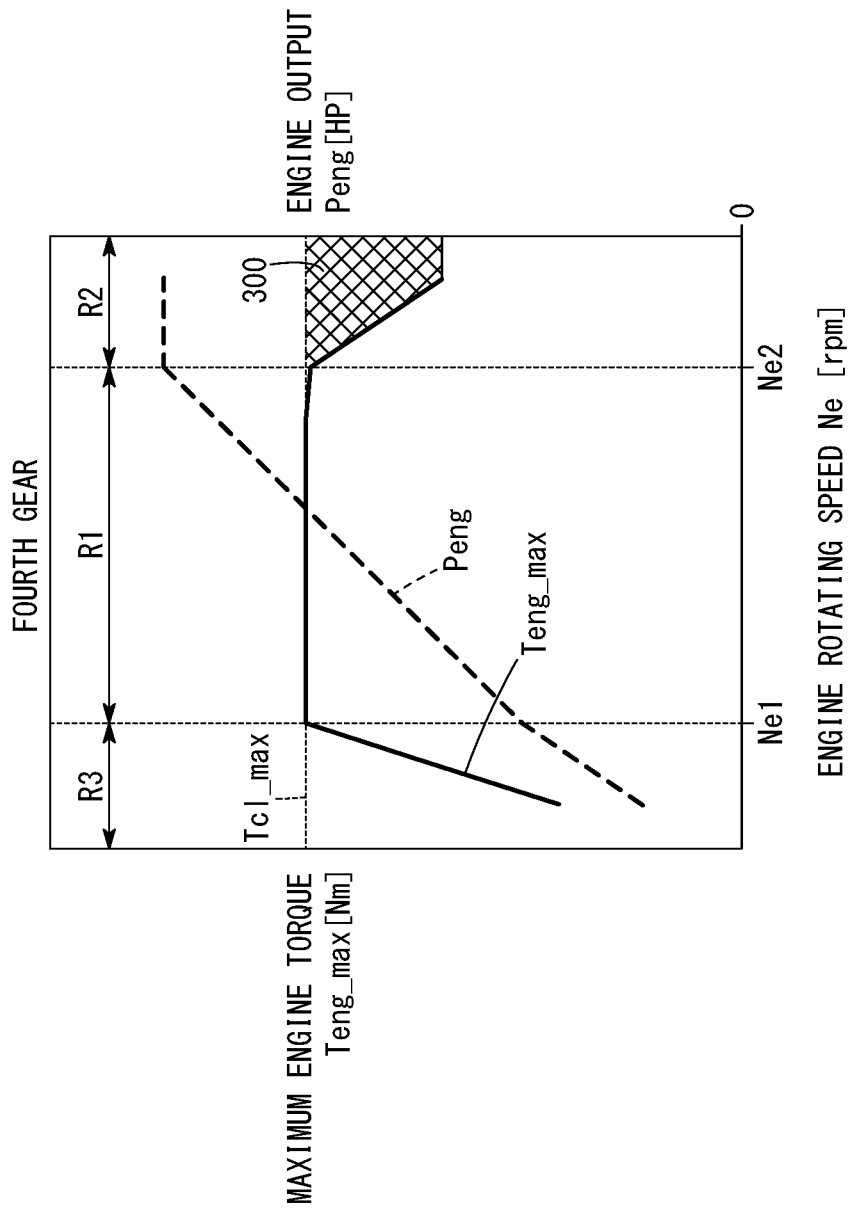
FIG. 6 shows an example of the relationship between engine rotating speed, maximum engine torque, and engine output in the embodiment.

FIG. 6 shows an example of the relationship between the engine rotating speed Ne, the maximum engine torque Teng_max, and engine output Peng in this embodiment. In FIG. 6, Tcl_max indicates a maximum transmission torque Tcl_max of the clutch 36 (also referred to hereinafter as "maximum clutch-transmission torque Tcl_max"). The maximum transmission torque Tcl_max is the maximum torque that can be transmitted from the side of the engine 32 and the CRK MOT 34 to the side of the rear wheel 30 by the clutch 36. In other words, the maximum transmission torque Tcl_max is a power transmission capacity of the clutch 36.

When the engine rotating speed Ne is equal to or lower than Ne1 or equal to or higher than Ne2, the maximum engine torque Teng_max is equal to or smaller than the maximum clutch-transmission torque Tcl_max. On the other hand, when the engine rotating speed Ne is above Ne1 and below Ne2, the maximum engine torque Teng_max is above the maximum clutch-transmission torque Tcl_max. Hereinafter, a region of the engine rotating speed Ne that is above Ne1 and below Ne2 is referred to as a first Ne region R1; a region of the engine rotating speed Ne that is above Ne2 is referred to as a second Ne region R2; and a region of the engine rotating speed Ne that is below Ne1 is referred to as a third Ne region R3.

When the maximum engine torque Teng_max is equal to or greater than the maximum clutch-transmission torque Tcl_max, the sum of the maximum engine torque Teng_max and the CRK MOT torque Tcrk exceeds the maximum clutch-transmission torque Tcl_max if the CRK MOT torque Tcrk is generated. In this case, generation of CRK MOT torque Tcrk is not effective because the excess above the maximum clutch-transmission torque Tcl_max results in idling of the clutch 36. Accordingly, the ECU 28 in this embodiment does not generate CRK MOT torque Tcrk when the engine rotating speed Ne is equal to or higher than Ne1 and equal to or lower than Ne2.

In this embodiment, when the engine rotating speed Ne is below Ne1, the target total torque Ttotal_tar of the vehicle 10 can be attained only with the maximum engine torque Teng_max. Thus, the ECU 28 does not generate CRK MOT torque Tcrk when the engine rotating speed Ne is less than Ne1. However, even when the engine rotating speed Ne is below Ne1, the ECU 28 may generate CRK MOT torque Tcrk if, for example, the target total torque Ttotal_tar cannot be attained only with the maximum engine torque Teng_max.

In this embodiment, when the engine rotating speed Ne is above Ne2, the target total torque Ttotal_tar of the vehicle 10 cannot be attained only with the maximum engine torque Teng_max (the specifications of the engine 32 and the clutch 36 are so designed). In this case, the ECU 28 generates CRK MOT torque Tcrk when the engine rotating speed Ne is above Ne2.

(A-2-3-3. Instantaneous Assistance Control)

As mentioned above, the instantaneous assistance control refers to control that momentarily compensates for a response delay of the engine torque Teng with motor torque Tmot (with CRK MOT torque Tcrk in particular) when the engine 32 is activated. The instantaneous assistance control may be used when switching from the MOT traveling mode to the ENG traveling mode (when the engine 32 is started) or when the transmission 38 is upshifted, for example.

When the engine 32 is to be started, the following steps are taken before the engine torque Teng reaches a target value (for example, the target total torque Ttotal_tar). Specifically, a crankshaft (not shown) is first rotated via the CRK MOT 34 prior to ignition to increase the engine rotating speed Ne. At the ignition timing, the engine 32 is ignited. After the ignition, the engine rotating speed Ne (engine torque Teng) is increased. The engine torque Teng reaches the target value (for example, the target total torque Ttotal_tar).

These steps require a longer time than in the case where the CRK MOT 34 generates torque Tcrk. Thus, the ECU 28 makes the CRK MOT 34 generate assisting torque Tcrk_asi to momentarily compensate for the response delay of the engine torque Teng after the startup of the engine 32 until the engine torque Teng reaches the target value.

When the transmission 38 is upshifted, the engine torque Teng temporarily drops. Thus, the ECU 28 makes the CRK MOT 34 generate assisting torque Tcrk_asi to momentarily compensate for the response delay of the engine torque Teng after the start of the upshift until the engine torque Teng reaches the target value.

The maximum of the assisting torque Tcrk_asi in instantaneous assistance control may also be calculated based on the discharge limit value Pbat_lim of the battery 60 and the TRC MOT output limit torque Ttrc_lim (details will be discussed together with description of continuous assistance control).

(A-2-3-4. Operation Amount Threshold THθap)

Figure 7:
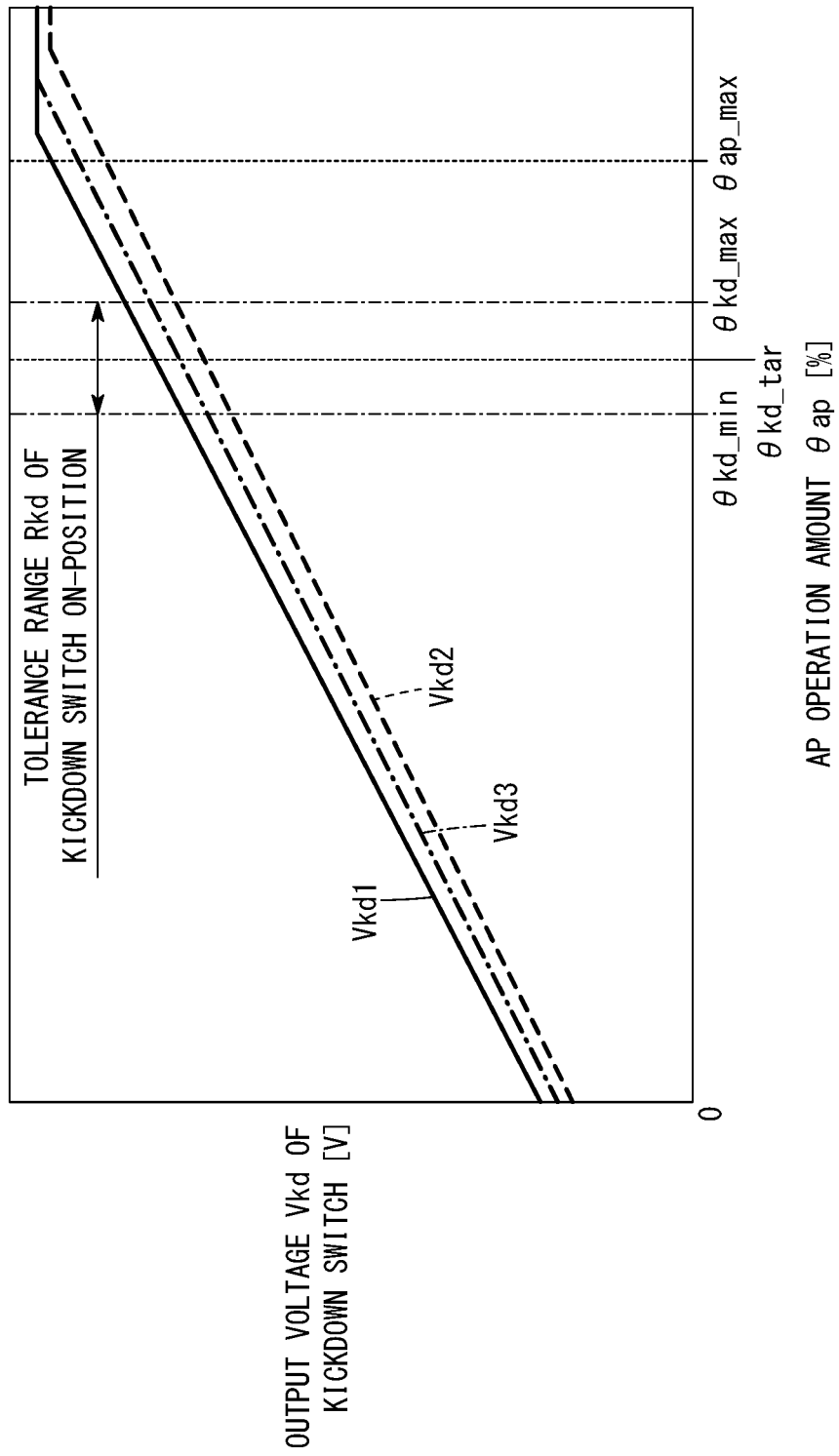
FIG. 7 is a diagram showing an example of the relationship between a kickdown threshold at which a kickdown switch turns on and the output voltage of the kickdown switch in the embodiment.

As mentioned above, the operation amount threshold THθap in this embodiment is the threshold of the AP operation amount θap used for determination of motor assistance (or the hybrid mode). As described below in greater detail, the operation amount threshold THθap is set in consideration of the AP operation amount θap at which the kickdown switch 92 turns on (hereinafter referred to as "kickdown threshold THθkd" or "KD threshold THθkd"). FIG. 7 is a diagram showing an example of the relationship between the kickdown threshold THθkd at which the kickdown switch 92 turns on and the output voltage Vkd of the kickdown switch 92 in this embodiment. In FIG. 7, the horizontal axis indicates the AP operation amount θap and the vertical axis indicates the output voltage Vkd of the kickdown switch 92.

FIG. 7 shows three output voltages Vkd (that is, output voltages Vkd1, Vkd2, and Vkd3). Characteristic Vkd1 indicates the characteristic of the output voltage Vkd being highest under the same AP operation amount θap, characteristic Vkd2 indicates the characteristic of the output voltage Vkd being lowest under the same AP operation amount θap, and characteristic Vkd3 indicates the characteristic of the output voltage Vkd being an average value under the same AP operation amount θap.

A value θap_max in FIG. 7 is the maximum of AP operation amount θap. At the maximum θap_max, the accelerator pedal 102 makes contact with a stopper not illustrated such that it cannot be pressed any further.

A range Rkd indicates a tolerance range in which the kickdown threshold THθkd is set. That is, for vehicles 10 of the same type, the AP operation amount θap at which the kickdown switch 92 turns on (KD threshold THθkd) is designed to fall in the tolerance range Rkd. The tolerance range Rkd is defined by minimum tolerance θkd_min and maximum tolerance θkd_max. For example, the tolerance range Rkd is set to any value ±5% to ±10% of a designed target value θkd_tar for the KD threshold THθkd. The designed target value θkd_tar is designed so that the output voltage Vkd of the kickdown switch 92 is in the range between Vkd1 and Vkd2 at any value being 75% to 90% of the maximum θap_max, for example.

In this embodiment, the operation amount threshold THθap is set at the minimum tolerance θkd_min or a value in the vicinity thereof (for example, any value within ±1.00% of the minimum tolerance θkd_min). For a majority or all of vehicles 10, this results in continuous assistance control (S19 in FIG. 5, and FIG. 8 discussed later) being started before the kickdown switch 92 turns on.

(A-2-3-5. Continuous Assistance Control)

(A-2-3-5-1. Overview)

Figure 8:
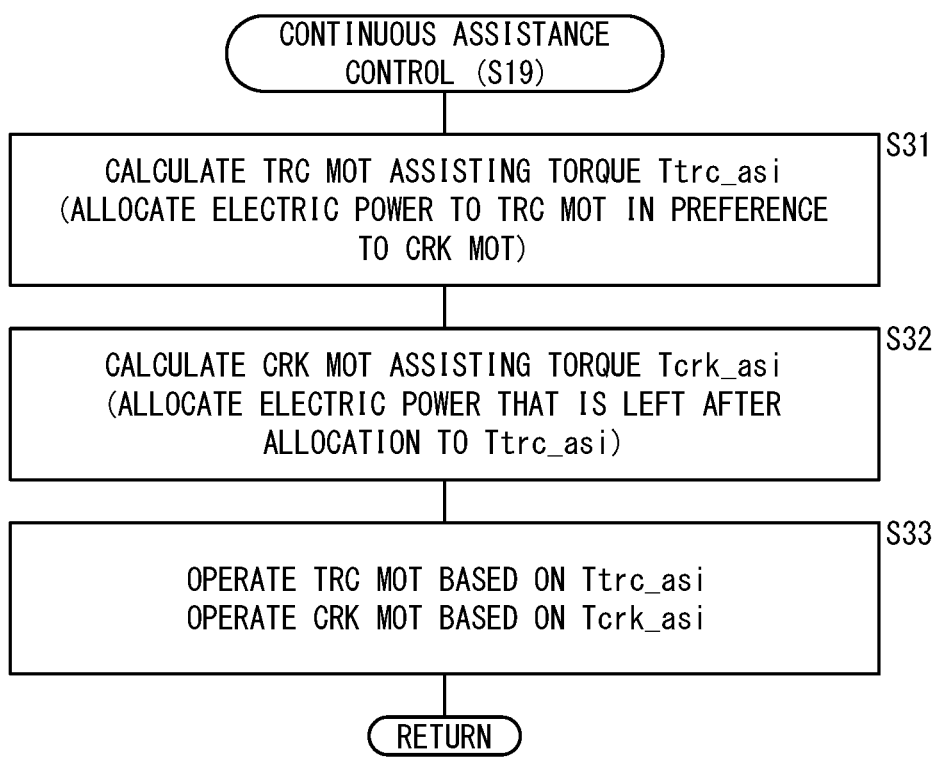
FIG. 8 is a flowchart of continuous assistance control in the embodiment.

FIG. 8 is a flowchart of continuous assistance control in this embodiment. At step S31, the ECU 28 calculates the TRC MOT assisting torque Ttrc_asi so that electric power will be allocated to the TRC MOTs 52a, 52b in preference to the CRK MOT 34 (details are discussed later with reference to FIG. 9).

At step S32, the ECU 28 calculates CRK MOT assisting torque Tcrk_asi so that the electric power that is left after allocation to the TRC MOT assisting torque Ttrc_asi will be allocated to the CRK MOT 34 (details are discussed later with reference to FIG. 12).

At step S33, the ECU 28 operates the TRC MOTs 52a, 52b based on the TRC MOT assisting torque Ttrc_asi and operates the CRK MOT 34 based on the CRK MOT assisting torque Tcrk_asi.

(A-2-3-5-2. Calculation of TRC MOT Assisting Torque Ttrc_asi)

(A-2-3-5-2-1. Overview)

Figure 9:
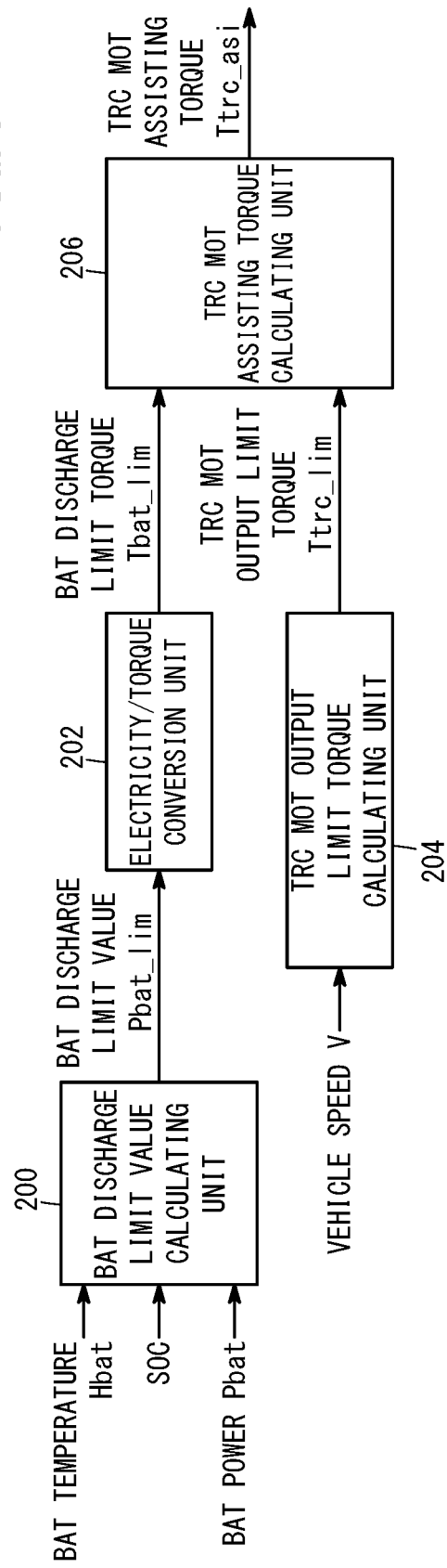
FIG. 9 is a block diagram illustrating the calculation of TRC MOT assisting torque in the continuous assistance control of the embodiment.

FIG. 9 is a block diagram illustrating the calculation of TRC MOT assisting torque Ttrc_asi in the continuous assistance control of this embodiment. As mentioned above, when calculating the TRC MOT assisting torque Ttrc_asi, the ECU 28 allocates electric power to the TRC MOTs 52a, 52b in preference to the CRK MOT 34.

As shown in FIG. 9, the ECU 28 includes a BAT discharge limit value calculating unit 200, an electricity/torque conversion unit 202, a TRC MOT output limit torque calculating unit 204, and a TRC MOT assisting torque calculating unit 206.

(A-2-3-5-2-2. BAT Discharge Limit Value Calculating Unit 200)

The BAT discharge limit value calculating unit 200 (also referred to hereinafter as "discharge limit value calculating unit 200") calculates the discharge limit value Pbat_lim of the battery 60 based on the temperature Hbat, the SOC, and the current Ibat of the battery 60.

Figure 10:
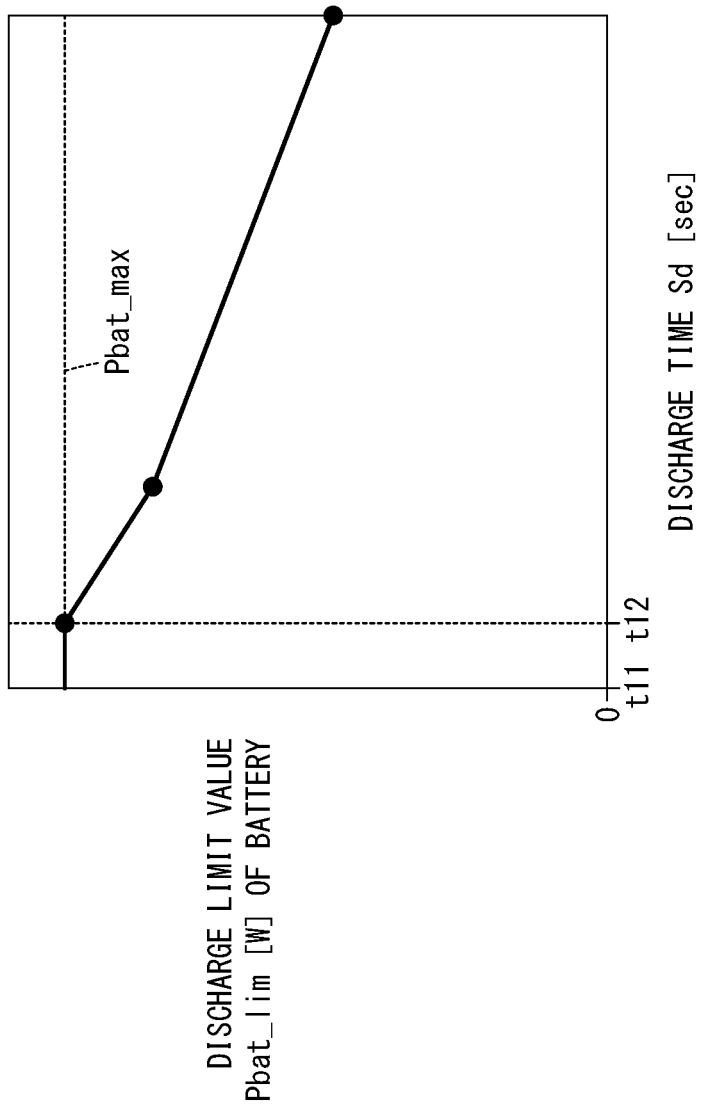
FIG. 10 is a diagram showing an example of the relationship between discharge time and discharge limit value of a battery in the embodiment.

FIG. 10 is a diagram showing an example of the relationship between a discharge time Sd and the discharge limit value Pbat_lim of the battery 60 in this embodiment. In FIG. 10, the horizontal axis indicates the discharge time Sd [sec] of the battery 60 and the vertical axis indicates the discharge limit value Pbat_lim [W]. FIG. 10 shows values for a case where the battery temperature Hbat and the SOC are predetermined values (fixed values) and the battery power Pbat varies along the discharge limit value Pbat_lim. From time t11 to time t12, the discharge limit value Pbat_lim is substantially constant at the maximum discharge Pbat_max, but after time t12, the discharge limit value Pbat_lim continuously decreases.

In this embodiment, the discharge limit value Pbat_lim is stored in the storage unit 114 per battery temperature Hbat, SOC, and discharge time Sd. This allows the ECU 28 to calculate the discharge limit value Pbat_lim corresponding to a combination of a battery temperature Hbat, an SOC, and a discharge time Sd.

(A-2-3-5-2-3. Electricity/Torque Conversion Unit 202)

The electricity/torque conversion unit 202 uses a theoretical value or a simulated value to calculate a torque (discharge limit torque Tbat_lim) [Nm] corresponding to the discharge limit value Pbat_lim [W].

(A-2-3-5-2-4. TRC MOT Output Limit Torque Calculating Unit 204)

The TRC MOT Output Limit Torque Calculating Unit 204 (also referred to hereinafter as "first limit torque calculating unit 204") calculates TRC MOT output limit torque Ttrc_lim (also referred to hereinafter as "first limit torque Ttrc_lim") based on the vehicle speed V.

Figure 11:
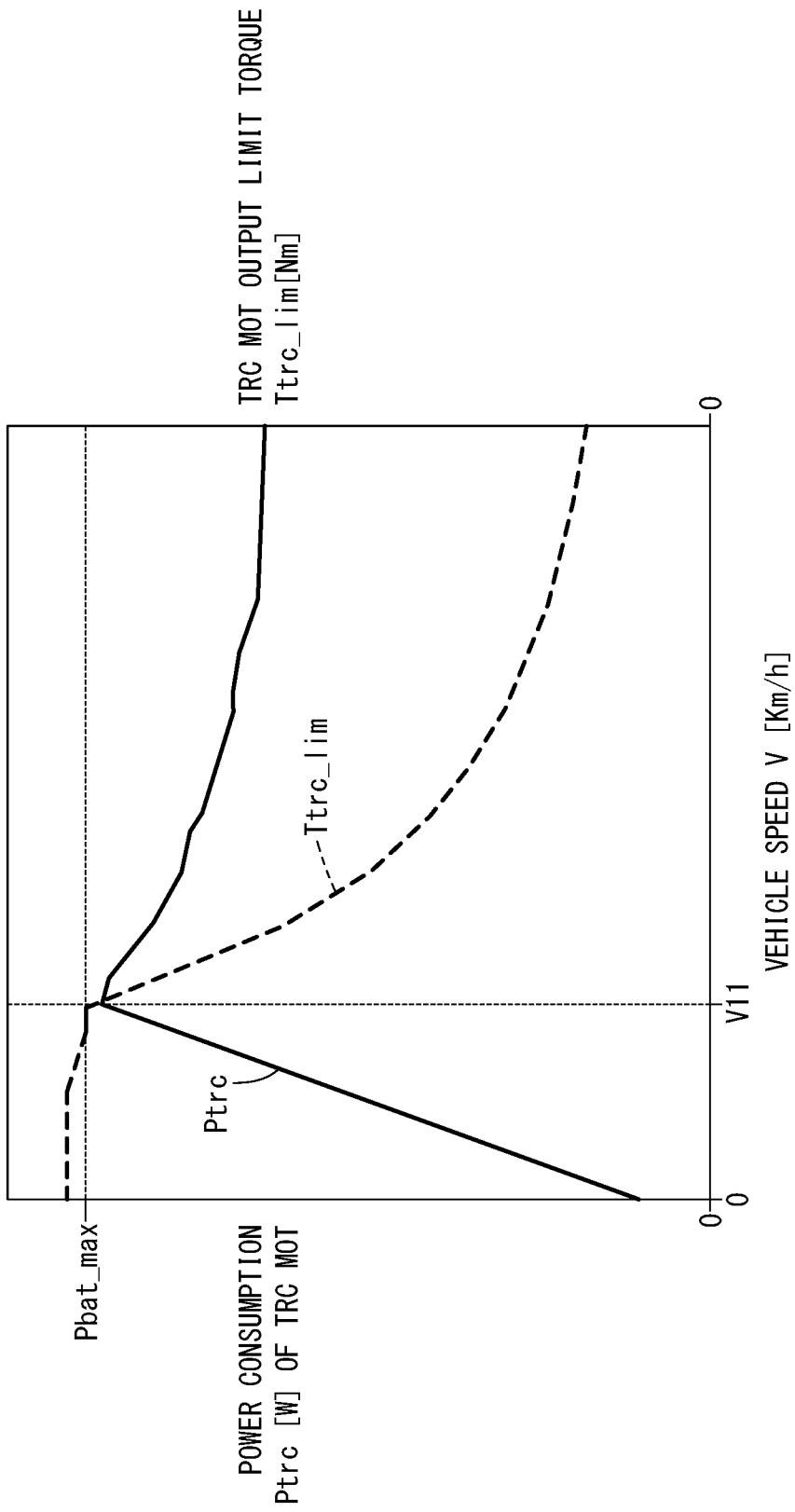
FIG. 11 is a diagram showing an example of the relationship between vehicle speed, the power consumption of a traction motor (TRC MOT), and TRC MOT output limit torque in the embodiment.

FIG. 11 is a diagram showing an example of the relationship between the vehicle speed V, the power consumption Ptrc of the TRC MOTs 52a, 52b, and the TRC MOT output limit torque Ttrc_lim (the first limit torque Ttrc_lim) in this embodiment. In FIG. 11, the horizontal axis indicates the vehicle speed V [km/h] and the vertical axis indicates the power consumption Ptrc and the first limit torque Ttrc_lim. When the vehicle speed V is between zero and V11, the power consumption Ptrc increases and the first limit torque Ttrc_lim slowly decreases. When the vehicle speed V is around V11, the first limit torque Ttrc_lim becomes maximum, and the power consumption Ptrc of the TRC MOTs 52a, 52b is closest to the maximum discharge Pbat_max of the battery 60 (which is the same as the one in FIG. 10).

When the vehicle speed V exceeds V11, the power consumption Ptrc and the first limit torque Ttrc_lim decrease. This creates a deviation (electricity margin) between the maximum discharge Pbat_max and the power consumption Ptrc. In this embodiment, this electricity margin is used to operate the CRK MOT 34 (details are described later).

Accordingly, the first limit torque calculating unit 204 can calculate the first limit torque Ttrc_lim based on the vehicle speed V.

In this embodiment, the number of revolutions (rotating speed) [rad/sec] of the TRC MOTs 52a, 52b per unit time is correlated with the vehicle speed V. Thus, the first limit torque Ttrc_lim may also be calculated based on the rotating speed of the CRK MOT 34 detected by a TRC MOT rotating speed sensor not illustrated.

(A-2-3-5-2-5. TRC MOT Assisting Torque Calculating Unit 206)

TRC MOT assisting torque calculating unit 206 (also referred to hereinafter as "first assisting torque calculating unit 206") calculates the lesser of the discharge limit torque Tbat_lim from the electricity/torque conversion unit 202 and the first limit torque Ttrc_lim from the first limit torque calculating unit 204 as TRC MOT assisting torque Ttrc_asi.

As can be seen from the foregoing, the TRC MOT assisting torque Ttrc_asi is calculated based on the BAT discharge limit value Pbat_lim and the TRC MOT output limit torque Ttrc_lim. Thus, note that in a situation where the AP operation amount θap is above the operation amount threshold THθap, the TRC MOT assisting torque Ttrc_asi is independent from the AP operation amount θap (in other words, the TRC MOT assisting torque Ttrc_asi does not vary directly with change in the AP operation amount θap).

(A-2-3-5-3. Calculation of CRK MOT Assisting Torque Tcrk_asi)

(A-2-3-5-3-1. Overview)

Figure 12:
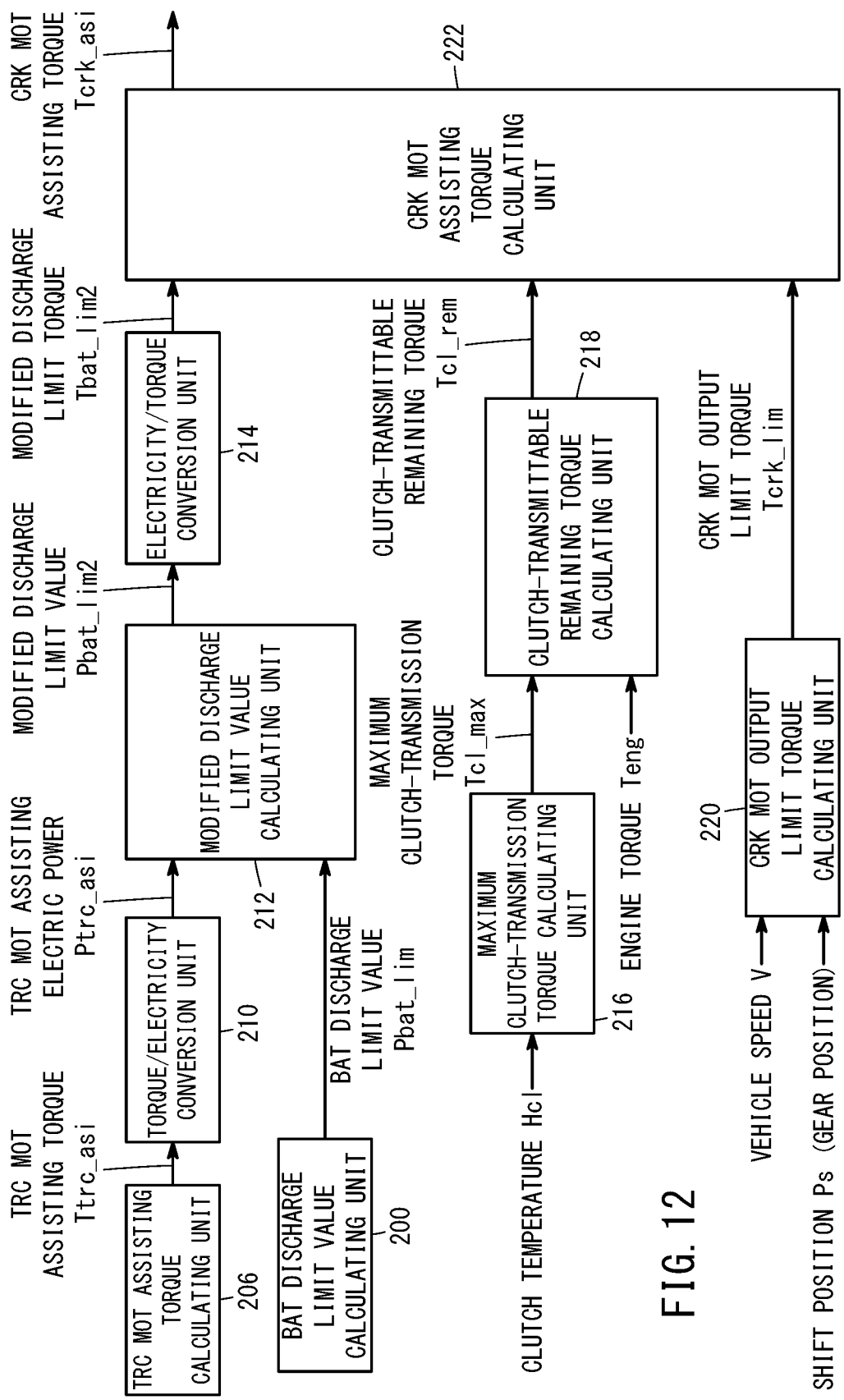
FIG. 12 is a block diagram illustrating the calculation of CRK MOT assisting torque in the continuous assistance control of the embodiment.

FIG. 12 is a block diagram illustrating the calculation of CRK MOT assisting torque Tcrk_asi in the continuous assistance control of this embodiment. As mentioned above, when calculating the CRK MOT assisting torque Tcrk_asi, the ECU 28 allocates to the CRK MOT 34 the electric power that is left after allocation to the TRC MOT assisting torque Ttrc_asi.

As shown in FIG. 12, in addition to the BAT discharge limit value calculating unit 200 and the TRC MOT assisting torque calculating unit 206 described above, the ECU 28 includes a torque/electricity conversion unit 210, a modified discharge limit value calculating unit 212, an electricity/torque conversion unit 214, a maximum clutch-transmission torque calculating unit 216, a clutch-transmittable remaining torque calculating unit 218, a CRK MOT output limit torque calculating unit 220, and a CRK MOT assisting torque calculating unit 222.

(A-2-3-5-3-2. Torque/Electricity Conversion Unit 210)

The torque/electricity conversion unit 210 calculates an electric power (TRC MOT assisting electric power Ptrc_asi) corresponding to the TRC MOT assisting torque Ttrc_asi calculated by the TRC MOT assisting torque calculating unit 206. For the calculation, a theoretical value or a simulated value is used.

(A-2-3-5-3-3. Modified Discharge Limit Value Calculating Unit 212)

The modified discharge limit value calculating unit 212 calculates the deviation between the discharge limit value Pbat_lim calculated by the BAT discharge limit value calculating unit 200 and the TRC MOT assisting electric power Ptrc_asi calculated by the torque/electricity conversion unit 210 as modified discharge limit value Pbat_lim2 (Pbat_lim2=Pbat_lim−Ptrc_asi).

(A-2-3-5-3-4. Electricity/Torque Conversion Unit 214)

The electricity/torque conversion unit 214 calculates a torque corresponding to the modified discharge limit value Pbat_lim2 (modified discharge limit torque Tbat_lim2).

(A-2-3-5-3-5. Maximum Clutch-Transmission Torque Calculating Unit 216)

The maximum clutch-transmission torque calculating unit 216 calculates the maximum clutch-transmission torque Tcl_max based on the clutch temperature Hcl. As described above with reference to FIG. 6, the maximum transmission torque Tcl_max is the maximum torque that can be transmitted from the side of the engine 32 and the CRK MOT 34 to the side of the rear wheel 30 by the clutch 36. In other words, the maximum transmission torque Tcl_max is the power transmission capacity of the clutch 36.

As the clutch temperature Hcl increases, the maximum clutch-transmission torque Tcl_max decreases. Thus, in this embodiment, the relationship between the clutch temperature Hcl and the maximum clutch-transmission torque Tcl_max is stored as a map in the storage unit 114. The ECU 28 then calculates the maximum clutch-transmission torque Tcl_max based on the clutch temperature Hcl. The maximum clutch-transmission torque Tcl_max may also be set as a fixed value without using the clutch temperature Hcl.

(A-2-3-5-3-6. Clutch-Transmittable Remaining Torque Calculating Unit 218)

The clutch-transmittable remaining torque calculating unit 218 calculates the deviation between the maximum clutch-transmission torque Tcl_max and the engine torque Teng as clutch-transmittable remaining torque Tcl_rem.

(A-2-3-5-3-7. CRK MOT Output Limit Torque Calculating Unit 220)

The CRK MOT output limit torque calculating unit 220 (also referred to hereinafter as "second limit torque calculating unit 220") calculates CRK MOT output limit torque Tcrk_lim (also referred to hereinafter as "second limit torque Tcrk_lim") based on the vehicle speed V and the shift position Ps (gear position).

Specifically, the second limit torque Tcrk_lim depends on the vehicle speed V and the shift position Ps (gear position). The ECU 28 thus calculates the second limit torque Tcrk_lim based on the vehicle speed V and the shift position Ps (gear position). If the influence of the gear position is minor, however, the ECU 28 may calculate the second limit torque Tcrk_lim based only on the vehicle speed V. Alternatively, the ECU 28 may calculate the second limit torque Tcrk_lim based on the number of revolutions (rotating speed) [rad/sec] of the CRK MOT 34 per unit time as detected by a CRK MOT rotating speed sensor not illustrated.

(A-2-3-5-3-8. CRK MOT Assisting Torque Calculating Unit 222)

The CRK MOT assisting torque calculating unit 222 (also referred to hereinafter as "second assisting torque calculating unit 222") calculates the smallest of the modified discharge limit torque Tbat_lim2, the clutch-transmittable remaining torque Tcl_rem, and the second limit torque Tcrk_lim as CRK MOT assisting torque Tcrk_asi.

As mentioned above, the modified discharge limit torque Tbat_lim2 corresponds to the modified discharge limit value Pbat_lim2 that is the deviation between the discharge limit value Pbat_lim and the TRC MOT assisting electric power Ptrc_asi. Thus, electric power that is left after allocation to TRC MOT assisting torque Ttrc_asi will be allocated to the CRK MOT 34.

Accordingly, the second limit torque calculating unit 220 can calculate the second limit torque Tcrk_lim. The second limit torque calculating unit 220 may limit the amount of change in the second limit torque Tcrk_lim per unit time in order to prevent change in the second limit torque Tcrk_lim from becoming large.

As can be seen from the foregoing, the CRK MOT assisting torque Tcrk_asi is calculated from the BAT discharge limit value Pbat_lim, the TRC MOT output limit torque Ttrc_lim, and the CRK MOT output limit torque Tcrk_lim. Thus, note that in a situation where the AP operation amount θap is above the operation amount threshold THθap, the CRK MOT assisting torque Tcrk_asi is independent from the AP operation amount θap (in other words, the CRK MOT assisting torque Tcrk_asi does not vary directly as the AP operation amount θap changes).

(A-2-3-5-4. Specific Timing Chart)

(A-2-3-5-4-1. Specific Example 1: Continuous Assistance Control by TRC MOTs 52a, 52b)

FIG. 13A is a diagram showing a first example of temporal change in the AP operation amount θap in this embodiment. In FIG. 13A, the AP operation amount θap is constant from time t21 to time t22. At time t22, the AP operation amount θap starts to increase and at time t23 reaches the operation amount threshold THθap. Subsequently, the AP operation amount θap further increases to reach the maximum θap_max at time t24. From time t24 on, the AP operation amount θap remains constant at the maximum θap_max.

FIG. 13B is a diagram showing an example of the target total torque Ttotal_tar, target engine torque Teng_tar, and TRC MOT assisting torque Ttrc_asi corresponding to the AP operation amount θap of FIG. 13A. FIG. 13C is a diagram showing an example of gear positions corresponding to FIGS. 13A and 13B.

Since the AP operation amount θap is constant from time t21 to time t22, the target total torque Ttotal_tar and the target engine torque Teng_tar are constant. As the AP operation amount θap increases starting at time t22, the target total torque Ttotal_tar and the target engine torque Teng_tar also increase together.

At time t23, the AP operation amount θap reaches the operation amount threshold THθap (S18 in FIG. 5: YES). Thus, the ECU 28 initiates continuous assistance control by the TRC MOTs 52a, 52b (S19).

Although FIGS. 13A to 13C do not show continuous assistance control with the CRK MOT 34, the CRK MOT 34 also outputs assisting torque Tcrk_asi. The assisting torque of the CRK MOT 34 is described later with reference to FIGS. 14A to 14C. In the continuous assistance control, the ECU 28 increases the TRC MOT assisting torque Ttrc_asi from time t23.

From time t25 to time t26, the ECU 28 upshifts the transmission 38. In this example, it is upshifted from the third gear to the fourth gear. Along with the upshift, the target engine torque Teng_tar temporarily drops, during which the assisting torque of the TRC MOTs 52a, 52b does not change essentially. After completion of the upshift at time t26, the target total torque Ttotal_tar and the target engine torque Teng_tar gradually increase.

(A-2-3-5-4-2. Specific Example 2: Continuous Assistance Control by CRK MOT 34)

FIG. 14A is a diagram showing an example of temporal change in AP operation amount θap in this embodiment. In FIG. 14A, the AP operation amount θap is constant from time t31 to time t33. At time t33, the AP operation amount θap starts to increase and at time t35 reaches the operation amount threshold THθap. Subsequently, the AP operation amount θap further increases to reach the maximum θap_max at time t36. From time t36 on, the AP operation amount θap remains constant at the maximum θap_max.

FIG. 14B is a diagram showing an example of the target engine torque Teng_tar, engine-generated torque Teng, and CRK MOT assisting torque Tcrk_asi corresponding to the AP operation amount θap of FIG. 14A. FIG. 14C is a diagram showing an example of the CRK MOT assisting torque Tcrk_asi corresponding to the AP operation amount θap of FIG. 14A.

From time t31 to time t33, the AP operation amount θap is constant, but at time t32, the engine-generated torque Teng starts to decrease. This is because the engine rotating speed Ne has increased to be equal to or higher than Net (see FIG. 6). Meanwhile, the target engine torque Teng_tar is constant from time t31 to time t33 because it is calculated as a function of the AP operation amount θap. Consequently, a difference (gap) occurs between the target engine torque Teng_tar and the engine-generated torque Teng (see time t32 to time t33 in FIG. 14B).

The difference (gap) between the target engine torque Teng_tar and the engine-generated torque Teng may be assisted (or compensated for) by the CRK MOT 34 or the TRC MOTs 52a, 52b. In this embodiment, however, assistance (or compensation) with the CRK MOT 34 or the TRC MOTs 52a, 52b is not effected unless the AP operation amount θap exceeds the operation amount threshold THθap (see S18 in FIG. 5). Thus, the difference between the target engine torque Teng_tar and the engine-generated torque Teng is left intact.

As the AP operation amount θap increases starting at time t33, the target engine torque Teng_tar also increases together. Meanwhile, since the engine rotating speed Ne continues to increase, the engine-generated torque Teng continues to decrease.

At time t34, the target engine torque Teng_tar reaches the maximum clutch-transmission torque Tcl_max. Hence, the target engine torque Teng_tar is constant even though the AP operation amount θap increases after time t34.

At time t35, the AP operation amount θap reaches the operation amount threshold THθap (S18 in FIG. 5: YES). The ECU 28 thus initiates continuous assistance control with the CRK MOT 34 (S19). A region 300 in FIG. 6 indicates the region in which the CRK MOT assisting torque Tcrk_asi can be generated.

Although FIGS. 14A to 14C do not show the continuous assistance control by the TRC MOTs 52a, 52b, the TRC MOTs 52a, 52b also output assisting torque Ttrc_asi. Note that in this embodiment the ECU 28 generates the TRC MOT assisting torque Ttrc_asi independently from the AP operation amount θap (or the target engine torque Teng_tar corresponding to it). In other words, the TRC MOT assisting torque Ttrc_asi is output as a value close to a fixed value. Thus, the TRC MOT assisting torque Ttrc_asi is generated independently from the target engine torque Teng_tar.

In order to assist (or compensate for) the difference (gap) between the target engine torque Teng_tar (=the maximum transmission torque Tcl_max) and the engine-generated torque Teng, the ECU 28 gradually increases the CRK MOT assisting torque Tcrk_asi from time t35. This is because change in the overall torque Ttotal would be too steep if the assisting torque Tcrk_asi is varied as indicated by the broken line in FIG. 14C.

At time t37, the sum of the engine-generated torque Teng and the CRK MOT assisting torque Tcrk_asi becomes equal to the target engine torque Teng_tar. After that, as the engine-generated torque Teng further decreases starting at time t38, the CRK MOT assisting torque Tcrk_asi increases accordingly.

(A-2-3-5-5. Application to Instantaneous Assistance Control)

The method of calculating the CRK MOT assisting torque Tcrk_asi described for continuous assistance control is also applicable to instantaneous assistance control. That is, the maximum of the assisting torque Tcrk_asi can be calculated as the discharge limit value Pbat_lim of the battery 60 and the TRC MOT output limit torque Ttrc_lim. The ECU 28 then limits the CRK MOT assisting torque Tcrk_asi for momentarily compensating for the response delay of the engine torque Teng with the CRK MOT torque Tcrk at or below the maximum.

In the case of instantaneous assistance control, the CRK MOT assisting torque Tcrk_asi is generated in preference to the TRC MOT output limit torque Ttrc_lim. The ECU 28 therefore can first calculate the CRK MOT assisting torque Tcrk_asi and then the TRC MOT output limit torque Ttrc_lim. In instantaneous assistance control, only the CRK MOT assisting torque Tcrk_asi may be used.

<A-3. Effects of this Embodiment>

As described above, this embodiment calculates the CRK MOT assisting torque Tcrk_asi (additional power of the rotary electric machine) based on the difference between the maximum clutch-transmission torque Tcl_max (the power transmission capacity of the clutch 36) and the engine torque Teng (power) (FIG. 6, S32 in FIG. 8, and FIG. 12). This enables generation of total torque Ttotal (total power) in a range that can be transmitted by the clutch 36 even in a case where the CRK MOT 34 is positioned on the same side as the engine 32 relative to the clutch 36 (FIG. 1) and the CRK MOT assisting torque Tcrk_asi is generated in addition to the engine torque Teng.

Therefore, to the extent that the engine torque Teng does not exceed the maximum clutch-transmission torque Tcl_max, more power can be generated by the entire vehicle 10 or power can be increased or decreased more quickly, for example. Thus, the engine 32 can be appropriately assisted by the CRK MOT 34.

In this embodiment, the ECU 28 (power control device) calculates the CRK MOT assisting torque Tcrk_asi based on the difference between the maximum clutch-transmission torque Tcl_max and the maximum engine torque Teng_max (the maximum power of the internal combustion engine) (FIG. 6, S32 in FIG. 8, and FIG. 12).

As noted above, the CRK MOT assisting torque Tcrk_asi is calculated based on the difference between the maximum clutch-transmission torque Tcl_max and the maximum engine torque Teng_max. This enables generation of total torque Ttotal in a range that can be transmitted by the clutch 36 even in a case where the CRK MOT 34 is positioned on the same side as the engine 32 relative to the clutch 36 (FIG. 1) and the CRK MOT torque Tcrk is generated in addition to the maximum engine torque Teng_max. Thus, a relatively large total torque Ttotal can be generated.

In this embodiment, the ECU 28 (power control device) sets the first Ne region R1 (the first speed region), being a region of the engine rotating speed Ne in which the engine torque Teng alone can exceed the maximum clutch-transmission torque Tcl_max, and the second Ne region R2 (the second speed region), being a region of the engine rotating speed Ne which is higher than the first Ne region R1 and in which the engine torque Teng alone cannot exceed the maximum clutch-transmission torque Tcl_max (FIG. 6).

When the engine rotating speed Ne is in the first Ne region R1 (S16 in FIG. 5: YES), the ECU 28 generates the engine torque Teng without the CRK MOT assisting torque Tcrk_asi (S17). When the engine rotating speed Ne is in the second Ne region R2 (S16: NO), the ECU 28 generates the engine torque Teng and the CRK MOT assisting torque Tcrk_asi (S19).

This enables a relatively large total torque Ttotal to be generated in a region of relatively high engine rotating speed Ne (the second Ne region R2), while suppressing the power consumption of the CRK MOT 34 in a region of relatively low engine rotating speed Ne (the first Ne region R1).

In this embodiment, even if the engine rotating speed Ne is in the second Ne region R2 (the second speed region), when the operation amount θap is lower than the operation amount threshold THθap (S18 in FIG. 5: NO), the ECU 28 (power control device) does not perform continuous assistance control (S19). In other words, the ECU 28 prohibits generation of CRK MOT assisting torque Tcrk_asi (additional power of the rotary electric machine).

This can suppress the power consumption of the CRK MOT 34 when the driver has no or weak intention for acceleration. Thus, electric power management suiting the driver's intention for acceleration becomes possible (for example, power saving when he/she has low intention for acceleration).

In this embodiment, the vehicle 10 has the kickdown switch 92 for effecting a kickdown to downshift the transmission 38 when a certain pressing operation is done on the accelerator pedal 102 (FIG. 2). Also, the ECU 28 (power control device) sets the operation amount threshold THθap to a value smaller than the kickdown threshold THθkd (FIG. 7), which is the operation amount θap at which the kickdown switch 92 turns on.

This will cause the CRK MOT assisting torque Tcrk_asi and the TRC MOT assisting torque Ttrc_asi to be already generated when the driver recognizes that the kickdown switch 92 has turned on. This can prevent the driver from feeling confused about the CRK MOT assisting torque Tcrk_asi and TRC MOT assisting torque Ttrc_asi not being generated even though the driver has kicked down.

B. Variations

As will be apparent, the present invention is not limited to the above embodiment but may adopt various other configurations based on the description herein. For example, the following configurations may be adopted.

<B-1. Vehicle 10 (the Subject of Application)>

The above embodiment described the vehicle 10 which is an automatic four-wheel car (FIG. 1). However, the present invention is not limited thereto from the perspective of calculating the CRK MOT assisting torque Tcrk_asi based on the difference between the maximum clutch-transmission torque Tcl_max and the engine torque Teng, for example. For example, the vehicle 10 may be either an automatic three- or six-wheel car.

In the above embodiment, the vehicle 10 has one engine 32 and three motors 34, 52a, 52b as drive sources (prime motors) (FIG. 1). However, the present invention is not limited thereto from the perspective of calculating the CRK MOT assisting torque Tcrk_asi based on the difference between the maximum clutch-transmission torque Tcl_max and the engine torque Teng, for example. For example, the vehicle 10 may have only one engine 32 and the CRK MOT 34 as drive sources.

In the above embodiment, the rear wheel 30 is driven by the rear wheel drive device 20 including the engine 32 and the first motor 34, and the front wheel 50 is driven by the front wheel drive device 22 including the second and third motors 52a, 52b (FIG. 1). However, the present invention is not limited thereto from the perspective of calculating the CRK MOT assisting torque Tcrk_asi based on the difference between the maximum clutch-transmission torque Tcl_max and the engine torque Teng, for example.

Figure 15:
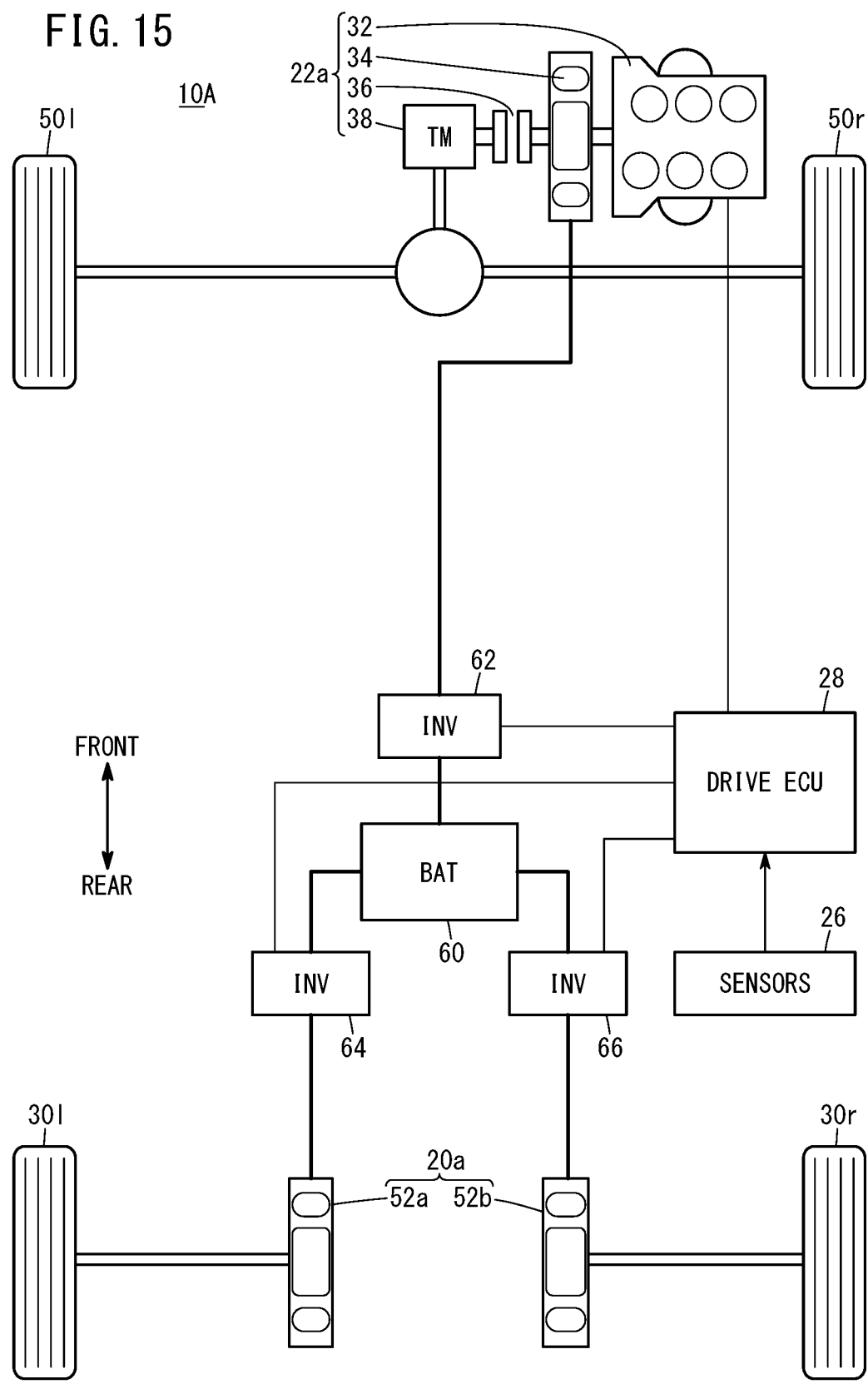
FIG. 15 schematically shows the configuration of part of a vehicle according to a variation of the present invention.

FIG. 15 schematically shows the configuration of part of a vehicle 10A according to a variation of the present invention. In the vehicle 10A, the features of the rear wheel drive device 20 and the front wheel drive device 22 of the vehicle 10 according to the above embodiment are reversed. That is, a rear wheel drive device 20a of the vehicle 10A has second and third traction motors 52a, 52b positioned on the rear side of the vehicle 10A. A front wheel drive device 22a of the vehicle 10A has the engine 32 and the first traction motor 34 disposed in series on the front side of the vehicle 10A.

In the above embodiment, the combination of the engine 32 and the CRK MOT 34 is connected with the rear wheel 30, and the TRC MOTs 52a, 52b are connected with the front wheel 50 (FIG. 1). In the variation in FIG. 15, the combination of the engine 32 and the CRK MOT 34 is connected with the front wheel 50 and the TRC MOTs 52a, 52b are connected with the rear wheel 30. That is, the wheel to which the combination of the engine 32 and the CRK MOT 34 is connected (the first wheel) is different from the wheel to which the TRC MOTs 52a, 52b are connected (the second wheel).

However, the present invention is not limited thereto from the perspective of calculating the CRK MOT assisting torque Tcrk_asi based on the difference between the maximum clutch-transmission torque Tcl_max and the engine torque Teng. For example, the engine 32, the CRK MOT 34, and the TRC MOTs 52*a*, 52*b* may be connected with the front wheel 50. In this case, the engine 32 and the CRK MOT 34 may be connected with the front wheel 50 via the clutch 36 and the TRC MOTs 52*a*, 52*b* may be connected with the front wheel 50 without via the clutch 36.

<B-2. First to Third Traction Motors 34, 52*a*, 52*b*>

The first to third traction motors 34, 52*a*, 52*b* are three-phase AC brushless motors in the above embodiment, but the present invention is not limited thereto. For example, the first to third traction motors 34, 52*a*, 52*b* may be three-phase AC brushed motors or single-phase AC or DC motors.

Although the first to third traction motors 34, 52*a*, 52*b* are supplied with electric power from the high-voltage battery 60 in the above embodiment, they may be additionally supplied with electric power from a fuel cell.

<B-3. Vehicle Power Control>

[B-3-1. Setting of Target Total Torque Ttotal_tar]

The above embodiment assumes that the torques of the rear wheel drive device 20 and the front wheel drive device 22 are controlled based on operation of the accelerator pedal 102 by a driver (a steering entity) in the vehicle 10. However, the present invention is not limited thereto from the perspective of controlling the torques of the rear wheel drive device 20 and the front wheel drive device 22, for example. For example, the present invention is also applicable to an arrangement for automated control of the torques of the rear wheel drive device 20 and the front wheel drive device 22 in the vehicle 10 (an arrangement for so-called automated-driving). The present invention is also applicable to an arrangement for the driver to remotely operate the vehicle 10 from outside.

In the above embodiment, the drive ECU 28 performs control which involves computation on the torques themselves of the rear wheel drive device 20 and the front wheel drive device 22 (FIG. 5). However, the present invention is not limited thereto from the perspective of controlling the torques (power) of the rear wheel drive device 20 and the front wheel drive device 22, for example. For example, in place of torque, the drive ECU 28 may perform control which involves computation on output or drive force that can be converted to/from torque.

[B-3-2. Target Engine Torque Teng_tar]

In the above embodiment, when the target total torque Ttotal_tar is not equal to or not smaller than the maximum engine torque Teng_max (S16: NO), the maximum engine torque Teng_max as a function of the engine rotating speed Ne is set as the target engine torque Teng_tar (S19 in FIG. 5, for example). However, the present invention is not limited thereto from the perspective of calculating the CRK MOT assisting torque Tcrk_asi based on the difference between the maximum clutch-transmission torque Tcl_max and the engine torque Teng, for example. For example, the target engine torque Teng_tar may be set so that the engine 32 is operated at a constant rotating speed Ne at which the fuel efficiency of the engine 32 is high. In that case, the difference between the target total torque Ttotal_tar and the target engine torque Teng_tar may be generated in the CRK MOT 34 or the TRC MOTs 52*a*, 52*b*.

[B-3-3. Instantaneous Assistance Control]

In the above embodiment, instantaneous assistance control is executed (S15) such as at the time of switching from the MOT traveling mode to the ENG traveling mode (when the engine 32 is started) (S14 in FIG. 5: YES). However, when considering continuous assistance control, instantaneous assistance control can be omitted, for example. Conversely, when considering instantaneous assistance control, continuous assistance control can be omitted.

[B-3-4. Continuous Assistance Control]

(B-3-4-1. Timing of Continuous Assistance Control)

In the above embodiment, continuous assistance control (S19) is executed only in the second Ne region R2 (FIG. 6). However, the present invention is not limited thereto from the perspective of calculating the CRK MOT assisting torque Tcrk_asi utilizing the difference between the maximum clutch-transmission torque Tcl_max and the engine torque Teng, for example. For example, continuous assistance control may be executed in the third Ne region R3, in which the operation amount θap is less than Ne1.

In the above embodiment, the timing of continuous assistance control is determined based on the AP operation amount θap (S18 in FIG. 5). However, the present invention is not limited thereto from the perspective of generating assisting torque Tmot_asi only when the driver wants acceleration, for example. For example, for continuous assistance control, it is possible to determine whether the vehicle 10 is cruising or not based on the vehicle speed V, the activation of auto cruise control, and the like, and to prohibit continuous assistance control when the vehicle 10 is cruising.

(B-3-4-2. Operation Amount Threshold THθap)

In the above embodiment, the operation amount threshold THθap is set in consideration of the relationship with the kickdown threshold THθkd (FIG. 7). However, the present invention is not limited thereto from the perspective of suppressing power consumption associated with assistance with the motors 34, 52*a*, 52*b*, for example; the operation amount threshold THθap may be set to other value.

(B-3-4-3. MOT Assisting Torque Tmot_asi)

In the above embodiment, both the CRK MOT assisting torque Tcrk_asi and the TRC MOT assisting torque Ttrc_asi are generated as MOT assisting torque Tmot_asi in continuous assistance control (FIGS. 4 and 8). However, the present invention is not limited thereto from the perspective of calculating the CRK MOT assisting torque Tcrk_asi based on the difference between the maximum clutch-transmission torque Tcl_max and the engine torque Teng, for example. For example, only the CRK MOT assisting torque Tcrk_asi may be generated in continuous assistance control.

In the continuous assistance control of the above embodiment, TRC MOT assisting torque Ttrc_asi is generated in preference to CRK MOT assisting torque Tcrk_asi (FIGS. 8, 9, and 12). However, the present invention is not limited thereto from the perspective of calculating CRK MOT assisting torque Tcrk_asi based on the difference between the maximum clutch-transmission torque Tcl_max and the engine torque Teng, for example. For example, in continuous assistance control, CRK MOT assisting torque Tcrk_asi may be generated in preference to TRC MOT assisting torque Ttrc_asi.

In the above embodiment, when the AP operation amount θap is equal to or greater than the operation amount threshold THθap (S18 in FIG. 5: YES), MOT assisting torque Tmot_asi is set as a value independent from the AP operation amount θap (a value that does not directly increase or decrease as the AP operation amount θap increases or decreases) (FIGS. 4, 9, and 12).

However, the present invention is not limited thereto from the perspective of prohibiting the generation of motor assisting torque Tmot_asi when the AP operation amount θap is lower than the operation amount threshold THθap in the engine traveling mode (S18 in FIG. 5: NO), for example. For example, the MOT assisting torque Tmot_asi may be a value dependent on the AP operation amount θap (a value that directly increases or decreases as the AP operation amount θap increases or decreases). Alternatively, the MOT assisting torque Tmot_asi may be combination of a value independent from the AP operation amount θap and a value dependent on the AP operation amount θap.

In the continuous assistance control of the above embodiment, all of the BAT discharge limit torque Tbat_lim can be allocated to the TRC MOT assisting torque Ttrc_asi, and then the remainder can be allocated to the CRK MOT assisting torque Tcrk_asi (FIGS. 9 and 12). However, the present invention is not limited thereto from the perspective of allocating electric power to the TRC MOTs 52a, 52b in preference to the CRK MOT 34 on the engine 32 side when the assisting torque Tmot_asi is added to the engine torque Teng, for example.

For example, it is possible that more than half of the BAT discharge limit torque Tbat_lim (for example, 70% to 99%) may be allocated to the TRC MOT assisting torque Ttrc_asi, while less than half of the BAT discharge limit torque Tbat_lim (for example, 1% to 30%) may be allocated to the CRK MOT assisting torque Tcrk_asi.

(B-3-4-4. CRK MOT Assisting Torque Tcrk_asi)

In the above embodiment, the difference between the maximum clutch-transmission torque Tcl_max and the engine torque Teng can be entirely set as the CRK MOT assisting torque Tcrk_asi (FIGS. 6 and 12). However, the present invention is not limited thereto from the perspective of calculating the CRK MOT assisting torque Tcrk_asi based on the difference between the maximum clutch-transmission torque Tcl_max and the engine torque Teng, for example. For example, CRK MOT assisting torque Tcrk_asi may be the maximum clutch-transmission torque Tcl_max minus the engine torque Teng and allowance α (Tcrk_asi=Tcl_max−Teng−α).

In the above embodiment, the difference between the maximum clutch-transmission torque Tcl_max and the engine torque Teng can be set as the CRK MOT assisting torque Tcrk_asi (FIG. 12). In other words, the CRK MOT assisting torque Tcrk_asi is a variable value. However, the present invention is not limited thereto from the perspective of calculating the CRK MOT assisting torque Tcrk_asi based on the difference between the maximum clutch-transmission torque Tcl_max and the engine torque Teng, for example. For example, the CRK MOT assisting torque Tcrk_asi may be set as a fixed value.

[B-3-5. Others]

In the above embodiment, there are both cases where an equal sign is included and where it is not included in comparison of numerical values (FIG. 3, and S16 and S18 in FIG. 5). However, whether to include or not to include an equal sign in comparison of numerical values may be determined as desired if, for example, there is no particular meaning in including an equal sign or omitting an equal sign (in other words, if the effects of the present invention are achieved).

In this regard, determination of whether the target total torque Ttotal_tar is equal to or smaller than the maximum engine torque Teng_max at step S16 in FIG. 5, for example, may be replaced with determination of whether the target total torque Ttotal_tar is less than the maximum engine torque Teng_max. Similarly, determination of whether the AP operation amount θap is equal to or greater than the operation amount threshold THθap at step S18 in FIG. 5 may be replaced with determination of whether the AP operation amount θap is greater than the operation amount threshold THθap. In contrast, "Accelerator pedal: on (θap>0)" in FIG. 3 is a step for determining the on-state of the accelerator pedal 102; thus, not including the case where the AP operation amount θap is zero, has specific meaning.

C. Reference Signs List 10, 10A: vehicle
28: drive ECU (power control device)
32: engine (internal combustion engine)
34: CRK MOT (rotary electric machine)
36: clutch
38: transmission
92: kickdown switch
102: accelerator pedal
Ne: engine rotating speed
R1: first Ne region (the first speed region)
R2: second Ne region (the second speed region)
Tcl_max: maximum clutch-transmission torque (power transmission capacity)
Tcrk_asi: CRK MOT assisting torque (additional power of the rotary electric machine)
Teng: engine torque (power of the internal combustion engine)
Teng_max: maximum engine torque (the maximum power of the internal combustion engine)
THθap: operation amount threshold
THθkd: kickdown threshold
θap: AP operation amount (operation amount of the accelerator pedal)

The invention claimed is:

1. A vehicle comprising:
an internal combustion engine;
a rotary electric machine;
a transmission;
a clutch positioned between the transmission and combination of the internal combustion engine and the rotary electric machine; and
a power control device configured to control a power of the internal combustion engine and a power of the rotary electric machine,
wherein the power control device is configured to set:
a first speed region, being a region of rotating speed of the internal combustion engine in which the power of the internal combustion engine alone is configured to exceed the power transmission capacity of the clutch; and
a second speed region, being a region of the rotating speed which is higher than the first speed region and in which the power of the internal combustion engine alone is not configured to exceed the power transmission capacity of the clutch, and
when the rotating speed is in the first speed region, the power control device is configured to generate the power of the internal combustion engine without the additional power of the rotary electric machine, and
when the rotating speed is in the second speed region, the power control device is configured to generate the power of the internal combustion engine and the additional power of the rotary electric machine,
and wherein the power control device is configured to calculate an additional power of the rotary electric machine based on a difference between a power transmission capacity as a maximum transmission torque of the clutch and the power of the internal combustion engine.

2. The vehicle according to claim 1, wherein the power control device is configured to calculate the additional power of the rotary electric machine based on a difference between the power transmission capacity of the clutch and a maximum power of the internal combustion engine.

3. The vehicle according to claim 1, wherein even if the rotating speed is in the second speed region, when an operation amount of an accelerator pedal is lower than an operation amount threshold, the power control device is configured to prohibit generation of the additional power of the rotary electric machine.

4. The vehicle according to claim 3, wherein the vehicle includes a kickdown switch configured to effect a kickdown to downshift the transmission when a certain pressing operation is done on the accelerator pedal, and
the power control device is configured to set the operation amount threshold at a value smaller than a kickdown threshold which is the operation amount at which the kickdown switch turns on.

5. A vehicle comprising:
an internal combustion engine;
a rotary electric machine;
a transmission;
a clutch positioned between the transmission and combination of the internal combustion engine and the rotary electric machine; and
a power control device configured to control a power of the internal combustion engine and a power of the rotary electric machine,
wherein the power control device is configured to:
set a first speed region, being a region of rotating speed of the internal combustion engine in which the power of the internal combustion engine alone is configured to exceed the power transmission capacity of the clutch; and
set a second speed region, being a region of the rotating speed which is higher than the first speed region and in which the power of the internal combustion engine alone is not configured to exceed the power transmission capacity of the clutch, and
generate the power of the internal combustion engine without the additional power of the rotary electric machine when the rotating speed is in the first speed region,
generate the power of the internal combustion engine and the additional power of the rotary electric machine when the rotating speed is in the second speed region, and
calculate an additional power of the rotary electric machine based on a difference between a power transmission capacity of the clutch and the power of the internal combustion engine.

* * * * *